(12) United States Patent
Tanaka et al.

(10) Patent No.: US 8,098,853 B2
(45) Date of Patent: Jan. 17, 2012

(54) MICROPHONE UNIT AND SOUND INPUT APPARATUS

(75) Inventors: Fuminori Tanaka, Osaka (JP); Ryusuke Horibe, Osaka (JP); Shigeo Maeda, Hyogo (JP); Takeshi Inoda, Osaka (JP); Rikuo Takano, Ibaraki (JP); Kiyoshi Sugiyama, Tokyo (JP); Toshimi Fukuoka, Kanagawa (JP); Masatoshi Ono, Ibaraki (JP)

(73) Assignees: Funai Electric Co., Ltd., Osaka (JP); Funai Electric Advanced Applied Technology Research Institute Inc., Osaka (JP)

( * ) Notice: Subject to any disclaimer, the term of this patent is extended or adjusted under 35 U.S.C. 154(b) by 545 days.

(21) Appl. No.: 12/325,803

(22) Filed: Dec. 1, 2008

(65) Prior Publication Data

US 2009/0161886 A1 Jun. 25, 2009

(30) Foreign Application Priority Data

Nov. 30, 2007 (JP) ................................ 2007-310711

(51) Int. Cl.
*H04R 25/00* (2006.01)
(52) U.S. Cl. ........ 381/162; 381/104; 381/161; 381/355; 381/357

(58) Field of Classification Search ............... 381/104, 381/161, 162, 355, 357
See application file for complete search history.

(56) References Cited

U.S. PATENT DOCUMENTS

| 8,009,845 B2 * | 8/2011 | Sakurai et al. | 381/186 |
| 2005/0094837 A1 * | 5/2005 | Parker et al. | 381/355 |
| 2005/0259841 A1 * | 11/2005 | Caron et al. | 381/345 |

FOREIGN PATENT DOCUMENTS

| JP | 7-312638 | 11/1995 |
| JP | 9-331377 | 12/1997 |
| JP | 2001-186241 | 7/2001 |

* cited by examiner

*Primary Examiner* — Wai Sing Louie
(74) *Attorney, Agent, or Firm* — Osha Liang LLP

(57) ABSTRACT

A microphone unit includes: a partition member, including a vibration film configured to be vibrated by sound; a housing, defining an inner space, and formed with a first opening and a second opening, the inner space being divided into a first space and a second space by the partition member, the first space adapted to be communicated with an outer space via the first opening, and the second space adapted to be communicated with the outer space via the second opening; and a shutter, configured to close one of the first and second openings; and an amplifier, configured to: amplify an electric signal at a first gain when the shutter closes the one of the first and second openings; and amplify the electric signal at a second gain that is larger than the first gain when first and second openings are opened.

5 Claims, 19 Drawing Sheets

MICROPHONE UNIT AND SOUND INPUT APPARATUS

BACKGROUND

1. Field of the Invention

The present invention is related to a microphone unit, and a sound input apparatus.

2. Description of the Related Art

When telephone communications established by telephones, speech recognition, sound recording operations, and the like are carried out, it is desirable to collect only target voices (voices of users). However, under use environments of voice input apparatuses, sounds other than target voices such as background noise may be present. As a result, voice input apparatuses having functions capable of eliminating noises have been actively developed, by which voices of users can be correctly extracted even in such a case that these voice input apparatuses are utilized under such an environment that noises are present.

As technical ideas capable of eliminating noises under use environments where these noises are present, methods for eliminating noises by applying sharp directivity to microphone units have been proposed in the technical field. Otherwise, other methods for eliminating noises by performing such a signal processing operation that incoming directions of sound waves are discriminated by utilizing incoming time differences of the sound waves. The above technical ideas are disclosed in JP-A-7-312638, JP-A-9-331377 and JP-A-2001-186241.

Also, in recent year, compactnesses of electronic appliances have been progressed, so that such technical ideas capable of making voice input apparatuses compact may constitute important factors.

In order to give sharp directivity to microphone units, a large number of vibration films must be arranged. As a result, it is difficult to make these voice input apparatuses compact.

Also, in order to detect incoming directions of sound waves in higher precision by utilizing incoming differences of the sound waves, a plurality of vibration films must be arranged in such an interval nearly equal to 1/several wavelengths of audible sound waves. As a result, the voice input apparatuses can be hardly made compact.

Moreover, under such an environment that there is substantially no noise, it is not necessarily required to actively remove noises. Conversely, it is desirable to improve SNRs (Signal-to-Noise Ratios) with respect to noises generated in microphone units.

SUMMARY

It is therefore one advantageous aspect of the invention to provide a microphone unit and a voice input apparatus, having high qualities, the outer dimensions of which are small.

According to an aspect of the invention, there is provided a microphone unit, including: a housing, defining an inner space, and formed with a first opening and a second opening; a partition member, partitioning the inner space into a first space communicated with the first opening and a second space communicated with the second opening, the partition member comprising a vibration film configured to be vibrated by sound to generate an electric signal; and a shutter, configured to open or close one of the first opening and the second opening; and an amplifier, configured to: amplify the electric signal at a first gain when the shutter closes the one of the first opening and the second opening; and amplify the electric signal at a second gain that is larger than the first gain when first opening and the second opening are opened.

Alternatively, the housing may have a space other than the first space the second space.

Under such a status that either the first opening portion or the second opening portion has been closed, the gain to be applied to the electric signal based upon the vibrations of the vibration film may be set to a first predetermined value, and under such a status that both the first opening portion and the second opening portion have been opened, the gain to be applied to the electric signal based upon the vibrations of the vibration film may be set to a second predetermined value larger than the first predetermined value.

In accordance with the present invention, under such a status that two pieces of the opening portions have been opened, both user voices and noises are entered to both the planes of the vibration film. Since the sound pressure of the noises entered to both the planes of the vibration film from the remote place become substantially equal to each other, these noises are cancelled with each other by the vibration film. As a consequence, the sound pressure for vibrating the vibration film can be regarded as the sound pressure indicative of the user voices, and furthermore, the electric signal acquired based upon the vibrations of the vibration film can be regarded as the electric signal representative of the user voices, from which the noises have been eliminated.

Also, in accordance with the present invention, in such a case that the voices are entered to both the planes of the vibration film, the electric signal 38 having such a voltage level responding to the difference between the sound pressure applied to both the planes of the vibration film is acquired. Then, sound pressure is in inverse proportion to a distance measured from a sound source, so that the larger the difference between the distances measured from the sound source to the two opening portions is increased, the higher the voltage level of the acquired electric signal is increased. In other words, under such a status that both the two opening portions have been opened, the microphone unit can be caused to function as a microphone having dual directional characteristics, namely, sensitivity of this microphone has the highest sensitive value in such a case that the sound source is located on the straight line which connects the opening portions to each other.

Also, in accordance with the present invention, under such a status that any one of these two opening portion has been closed, both the user voices and the noises are entered to one plane of the vibration film. When the user voices are entered to both the planes of the vibration film, the sound pressure for vibrating the vibration film corresponds to the difference between the sound pressure applied to both the planes of the vibration film, whereas when the user voice is entered to the single plane of the vibration film, the sound pressure for vibrating the vibration film corresponds to the sound pressure which is applied to the single plane of the vibration film. As a consequence, under such a status that one of these two opening portions has been closed, the voltage level of the electric signal indicative of the user voice can be increased. As a result, under such an environment that there is substantially no noise, the SNR obtained under such a status that one of these two opening portions has been closed can be improved, as compared with the SNR obtained under such a status that both these two opening portions have been opened.

Also, in accordance with the present invention, under such a status that any one of the two opening portions has been closed, since both the user voices and the noises are entered to one plane of the vibration film, this microphone unit can be caused to function as the microphone having the omnidirectional characteristic. As a consequence, the microphone unit may also be utilized as such a use field that surrounding sounds are intentionally collected.

Moreover, in accordance with the present invention, the voltage level of the electric signal indicative of the user voices under such a status that both the opening portions have been opened is lower than the voltage level of the electric signal indicative of the user voices under such a status that any one of the two opening portions has been closed. As a consequence, when both the two opening portions have been opened, such a higher gain is applied to the electric signal indicative of the user voices, as compared with the gain applied to the electric signal when any one of the two opening portions has been closed. As a result, if the gain is properly set, then the sound volumes of the user voices outputted from the microphone unit an be kept constant even under such a status that both the two opening portions have been opened, and also, any one of the two opening portions has been closed. As a consequence, the microphone unit can avoid that since the sound volumes are rapidly changed, the user can hardly hear the conversation made by the counter person.

As previously explained, the present invention can provide such a microphone unit having the high quality and capable of changing the microphone characteristics, if required, while the microphone unit is equipped with the simple structure.

In the microphone unit according to the present invention, the above-descried amplifier may increase the gain applied to the electric signal when the present status is changed from such a status that any one of the first opening portion and the second opening portion has been closed to such a status that both the first opening portion and the second opening portion have been opened.

When the present status is changed from such a status that any one of the first opening portion and the second opening portion has been closed to such a status that both the first opening portion and the second opening portion have been opened, the amplifier may increase the gain to be applied to the electric signal based upon the vibration of the vibration film by a predetermined value, or may alternatively set the gain to be applied to the electric signal based upon the vibrations of the vibration film to a second predetermined value.

In the microphone unit according to the present invention, the above-described amplifier may decrease the gain applied to the electric signal when the present status is changed from such a status that both the first opening portion and the second opening portion have been opened to such a status that any one of the first opening portion and the second opening portion has been closed.

When the present status is changed from such a status that both the first opening portion and the second opening portion have been opened to such a status that any one of the first opening portion and the second opening portion has been closed, the amplifier may decrease the gain to be applied to the electric signal based upon the vibrations of the vibration film by a predetermined value, or may alternatively set the gain to be applied to the electric signal based upon the vibrations of the vibration film to a first predetermined value.

The microphone unit, according to the present invention, further comprising a detector, configured to detect whether or not the shutter closes the one of the first opening and the second opening, wherein the amplifier is configured to control a switching between the first gain and the second gain based on a detection result of the detector.

The detector may merely detect such a status that the two opening portions have been opened, or such a status that anyone of the two opening portions has been closed, and therefore, the detecting construction thereof is not restricted.

For instance, the detector may be realized by such a switch having a mechanical structure capable of sensing a contact to an opening portion, or may be alternatively realized as an optical sensor for sensing a light amount within the housing.

In the microphone unit according to the present invention, the detector may include a switch, arranged adjacent to either of the first opening or the second opening, the switch being configured to be activated when the shutter closes the one of the first opening and the second opening.

In accordance with the present invention, since the switch is provided adjacent to any one of these two opening portions, this opening portion can be closed by a finger of a user, and the same time, the switch can be pushed. As a consequence, in accordance with the microphone unit having such a simple construction, the gain of the output portion can be controlled in response to the open/close status of the opening portion.

In the microphone unit according to the present invention, the shutter may include a lid, configured to cover the one of the first opening and the second opening.

The lid portion may be made of such a structure that the lid portion is manually opened/closed by the user. Alternatively, the lid portion may be made of such a structure that the lid portion is opened/closed by depressing a predetermined button.

If the lid portion contains a open/close mechanism, then any types of opening/closing systems may be similarly employed. For example, a sliding type open/close mechanism may be employed, and a rotary type open/close mechanism may be alternatively employed.

In accordance with the present invention, since the lid portion is contained, the use is no longer required to continuously depress the opening portion, and thus, the opening portion may be continuously kept under open status, or under close status.

Alternatively, the microphone unit according to the present invention may be further includes a controller, configured to cause the shutter to open or close the.

The controller may compare the sound volume of the talking person with a predetermined reference value so as to control the open/close condition of the lid portion based upon a comparison result. Alternatively, the controller may control the open/close condition of the lid portion based upon a change in sound volumes of the talking person which were measured during a predetermined time period in the past.

Alternatively, the controller may control the open/close condition of the lid portion based upon a sound volume of a talking person and the present open/close condition of the lid portion. For example, under such a status that the lid portion has been closed, when the sound volume of the talking person is rapidly increased, since it is possible to predict that the present environment is changed into such an environment that noises are increased, the controller may control the lid portion to be opened. Also, for example, under such a status that the lid portion has been opened, when the sound volume of the talking person is rapidly decreased, since it is possible to predict that the present environment is changed into such an environment that noises are decreased, the controller may control the lid portion to be closed.

The controller may alternatively predict the sound volume of the talking person based upon the voltage level of the output signal from the amplifier.

In accordance with the present invention, since the microphone unit contains the controller for controlling the open/close conditions of the lid portion based upon the sound volume of the talking person, the user no longer pays her attention to the open, or close status of the lid portion, so that practical utility thereof can be furthermore improved.

The present invention is featured by a voice input apparatus on which the microphone unit recited in any one of the above-described items has been mounted.

In other words, the below-mentioned microphone unit has been mounted on the voice input apparatus according to the present invention. That is, the microphone unit is comprised of: a housing containing an inner space; a partition member for diving the inner space of the housing into a first space and a second space, at least of which is constructed of a vibration film; and an amplifier for applying a gain to an electric signal produced based upon a vibration of the vibration film so as to output the gain-applied electric signal; in which: both a first opening portion for communicating the first space to an outer space of the housing, and a second opening portion for communicating the second space to the outer space of the housing are formed in the housing; and under such a status that both the first opening portion and the second opening portion have been opened, the amplifier applies a higher gain to the electric signal so as to output the gain-applied electric signal, as compared with a gain applied to the electric signal under such a status that any one of the first opening portion and the second opening portion has been closed.

In accordance with the voice input apparatus, since both the two opening portions of the microphone unit are brought into open statuses, the electric signal indicative of the user voices can be acquired from which the noises have been eliminated in higher precision. As a consequence, in accordance with the present invention, it is possible to provide such a voice input apparatus capable of realizing a high-precision speech recognizing process operation, a voice authenticating process operation, or a command producing process operation executed based upon input voices.

The voice input apparatus, according to the present invention, may be further includes: a speaker which outputs sound information; and a sound controller for controlling a sound volume of the speaker; and in which: under such a status that both the first opening portion and the second opening portion have been opened, the sound controller may increase the sound volume of the speaker, as compared with such a status that any one of the first opening portion and the second opening portion has been closed.

In accordance with the present invention, in such a case that the user is operating the voice input apparatus under such a status that both these two opening portions of the microphone unit have been opened, it is predictable that the user is present under noisy environment. As a result, the sound volume of the speaker is increased, so that the user can easily hear the sounds produced from the speaker.

In the voice input apparatus according to the present invention, the sound controller may increase the sound volume of the speaker when the present status is changed from such a status that any one of the first opening portion and the second opening portion has been closed to such a status that both the first opening portion and the second opening portion have been opened.

In accordance with the present invention, when the present status is changed from the status under which any one of these two opening portions of the microphone has been closed to the status under which both the two opening portion have been opened, it is predictable that the present environment has been changed from the environment under which there is a small amount of noises to another environment under which there are large amounts of noise. As a result, the sound volume of the speaker is increased, so that the user can easily hear the sounds produced from the speaker.

In the voice input apparatus according to the present invention, the sound controller may decrease the sound volume of the speaker when the present status is changed from such a status that both the first opening portion and the second opening portion have been opened to such a status that any one of the first opening portion and the second opening portion has been closed.

In accordance with the present invention, when the present status is changed form the status under which both these two opening portions of the microphone have been opened to the status under which any one of these two opening portions has been closed, it is predictable that the present environment has been changed from the environment under which there are large amounts of noises to another environment under which there is a small amount of noises. As a result, the sound volume of the speaker is decreased, so that the user can easily hear the sounds produced from the speaker.

BRIEF DESCRIPTION OF THE DRAWINGS

Embodiment may be described in detail with reference to the accompanying drawings, in which.

DETAILED DESCRIPTION OF THE INVENTION

Referring now to drawings, a description is made of various embodiment modes to which the present invention has been applied. It should be understood that the present invention is not limited only to the below-mentioned embodiment modes. Also, it is so assumed that the present invention may include various sorts of technical ideas conceived by freely combining the below-mentioned contents with each other.

Figure 1A:
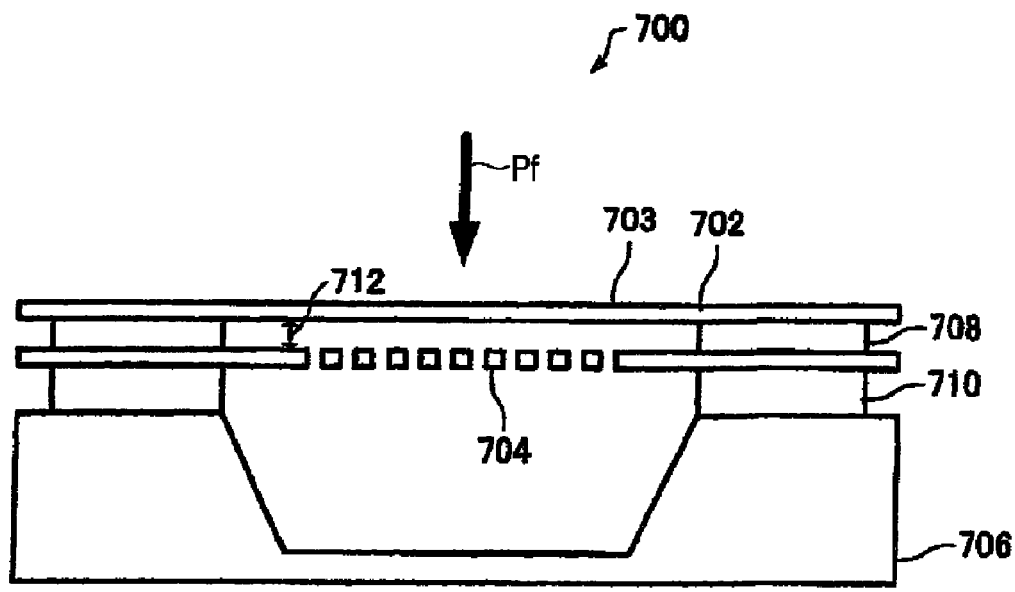
FIG. 1A is an explanatory diagram for explaining both a structure and a basic operation idea as to a normal microphone having a single vibration film.

FIG. 1A is an explanatory diagram for explanating both a structure and a basic operating idea of a normal microphone having a single vibration film. A microphone 700 corresponds to a capacitor type microphone, and may be constructed of a so-called "MEMS (Micro Electro Mechanical Systems)."

The microphone 700 has a vibration film 702. The vibration film 702 is such a film (thin-film) which is vibrated by receiving sound waves. The vibration film 702 has electric conductivity and, has formed one terminal of an electrode.

The microphone 700 also has an electrode 704 formed via an insulating film 710 on a base substrate 706. The electrode 704 has been arranged in such a manner that this electrode 704 is located via an insulating film 708 opposite to the vibration film 702, As a result, both the electrode 702 and the electrode 704 constitute a capacitance.

When sound waves are entered to the microphone 700, sound pressure "pf" is applied to one plane (upper plane) 703 of the vibration film 702. As a result, in response to the sound pressure "pf", the vibration film 702 is vibrated, and thus, an interval (gap interval 712) between the vibration film 702 and the electrode 704 is changed, so that a capacitance between the vibration film 702 and the electrode 704 is changed. Since this capacitance change is derived as, for example, a change in voltages, it is possible to acquire electric signals based upon vibrations of the vibration film 702. In other words, the sound waves entered to the microphone 700 can be converted into the electric signals, and the microphone 700 can output the electric signals.

It should also be noted that in the microphone 700, the electrode 704 may be alternatively made of such a construction which is not influenced by sound waves. For instance, the electrode 704 may alternatively have a mesh structure.

Figure 1B:
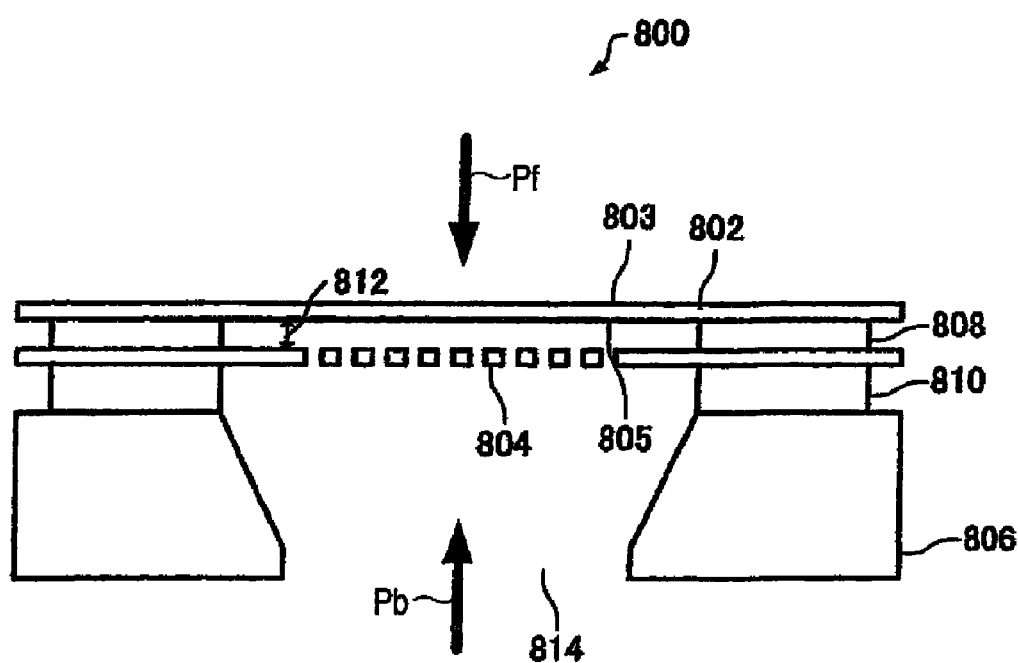
FIG. 1B is an explanatory diagram for explaining both a structure and a basic operation idea as to a differential microphone having a single vibration film.

FIG. 1B is an explanatory diagram for explaining both a structure and a basic operating idea of a differential microphone having a single vibration film. A microphone 800 corresponds to such a capacitor type microphone having a similar structure to that of the above-described microphone 700, namely, is equipped with a vibration film 802, an electrode 804, and insulating films 808 and 810, and may be constructed as the so-called "MEMS."

On the other hand, different from the microphone 700, a base substrate 806 of this microphone 800 contains an opening portion 814. As a consequence, when sound waves are entered to the microphone 800, sound pressure "pf" is applied to one plane (upper plane) 803 of the vibration film 802, and sound pressure "pb" is applied to the other plane (lower plane) 805 thereof, respectively. As a result, in response to a difference between the sound pressure "pf" and "pb", the vibration film 802 is vibrated, and thus, an interval (gap interval 812) between the vibration film 802 and the electrode 804 is changed, so that a capacitance between the vibration film 802 and the electrode 804 is changed. Since this capacitance change is outputted as, for example, a change in voltages, electric signals can be acquired based upon vibrations of the vibration film 802. In other words, the sound waves entered to the microphone 800 can be converted into the electric signals, and the microphone 800 can output the electric signals.

Also, while sounds are propagated through a medium, the sounds are attenuated, so that sound pressure (strengths and amplitudes of sound waves) is lowered Sound pressure is in inverse proportion to a distance measured from a sound source. Sound pressure "P" can be expressed by the below-mentioned formula (1) in accordance with a relationship between the sound pressure "P" and a distance "R" from the sound source:

$$R = K \times 1/R \quad \text{- - - (1)} \qquad \text{[Formula 1]}$$

It should be noted that symbol "K" is a proportional constant.

Figure 2:
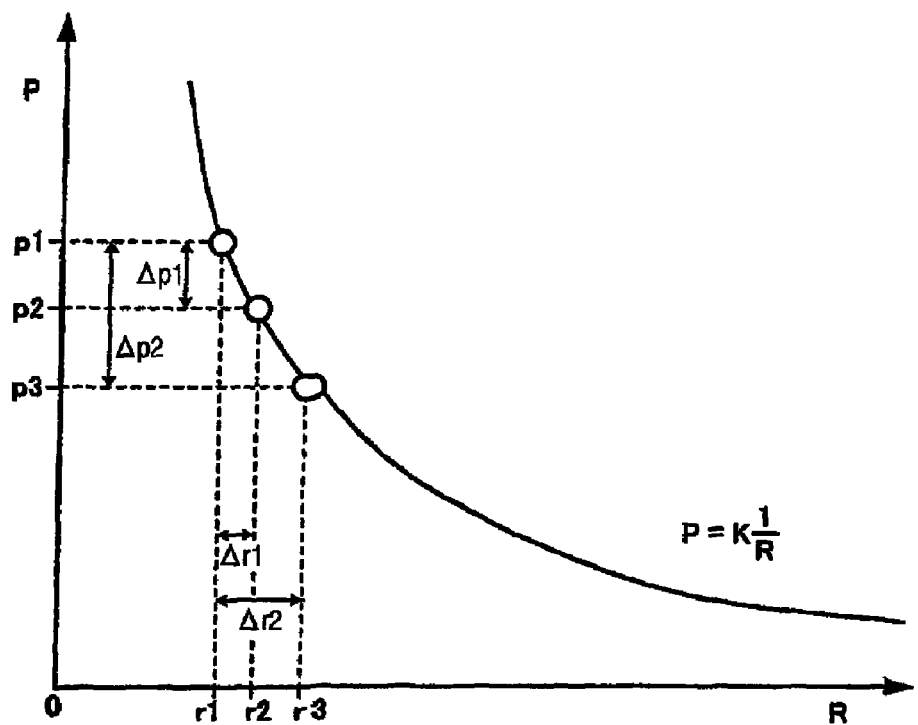
FIG. 2 is an explanatory diagram for explaining an attenuation characteristic of sound waves.

FIG. 2 is a graph for showing the above-described formula (1). As can be understood from this graph, the sound pressure (strengths and amplitudes of sound waves) "P" is rapidly attenuated at a position close to the sound source, and the further the position is separated from the sound source, the gentler the sound pressure "P" is attenuated. In the microphone 700 explained with reference to FIG. 1A, when a distance defined from a sound source to the upper plane 703 of the vibrating film 702 is equal to "r1", the sound pressure "pf" applied to the vibration film 702 becomes "p1."

Similarly, even in the microphone 800 described with reference to FIG. 1B, when a distance defined from a sound source to the upper plane 803 of the vibration film 802 is equal to "r1", the sound pressure "p1" is applied to the upper plane 803 of the vibration film 802. Also, since the sound waves are not diffused in a space between the opening portion 814 and the lower plane 805 of the vibration film 802, the sound waves are not substantially attenuated. As a result, if a distance defined from the sound source to the opening portion 814 is equal to "r2", then sound pressure "p2" is applied to the lower plane 805 of the vibration film 802.

As previously described, the microphone 800 converts the capacitance into the electric signal so as to output the converted electric signal, while the capacitance is changed in response to the difference between the sound pressure "pt" applied to the upper plane 803 of the vibration film 802 and the sound pressure "pb" applied to the lower plane 805 thereof. As a consequence, in such a case that both the microphone 700 and the microphone 800 are arranged over the same distance "r1" from the sound source, the output level of the microphone 800 is attenuated to an output level of the microphone 700, namely, (p1−p2)/p1 (=Δp1/p1).

Similarly, if the distance defined from the sound source to the Upper plane 703 of the vibration film 702 is equal to "r1", and the distance defined from the sound source to the opening portion 814 is equal to "r3", then the output level of the microphone 800 is attenuated to an output level of the microphone 700, namely, (p1−p3)/p1 (=Δp2/p1).

It should also be noted that since r2−r1 (=Δr1)<r3−r1 (=Δr2), and Δp1<Δp2, the following condition can be understood: That is, the smaller a difference between the distance from the sound source to the upper plane 703 of the vibration film 702, and the distance from the sound source to the opening portion 814 is decreased, the larger the output level of the microphone 800 is attenuated.

In the below-mentioned descriptions, such a microphone such as the microphone 700 that sound pressure is applied to a single plane of a vibration film will be referred to as a normal microphone, whereas such a microphone such as the microphone 800 that sound pressure is applied to both planes of a vibration film will be referred to as a differential microphone.

Figure 3:
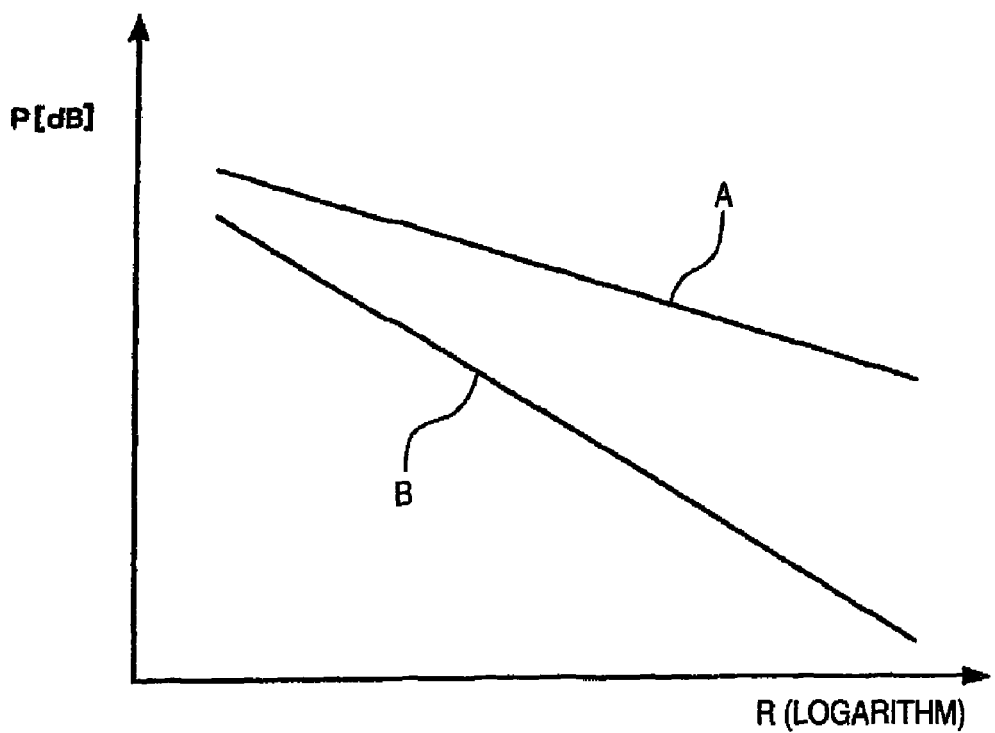
FIG. 3 is a diagram for representing an example as to a characteristic of a normal microphone, and a characteristic of a differential microphone characteristic.

FIG. 3 indicates one example as to a sound pressure level characteristic (normal microphone characteristic) A when sound-pressure is applied to a vibration film of a normal microphone, and another sound pressure level characteristic (differential microphone characteristic) B when sound pressure is applied to a vibration film of a differential microphone.

As previously explained, the sound pressure "pf" is applied to a single plane of the vibration film 702 in the microphone 700 (namely, normal microphone). On the other hand, the sound pressure "pf" and the sound pressure "pb" are applied to both planes of the vibration film 802 in the microphone 800 (differential microphone) respectively. As a result, the resulting pressure applied to the vibration film 802 becomes "pf−pb." As a consequence, as indicated in FIG. 3, the sound pressure level applied to the vibration film of the differential microphone is lower than the sound pressure level applied to the vibration film of the normal microphone, and further, the sound pressure level with respect to distances from a sound source is rapidly attenuated.

Figure 4A:
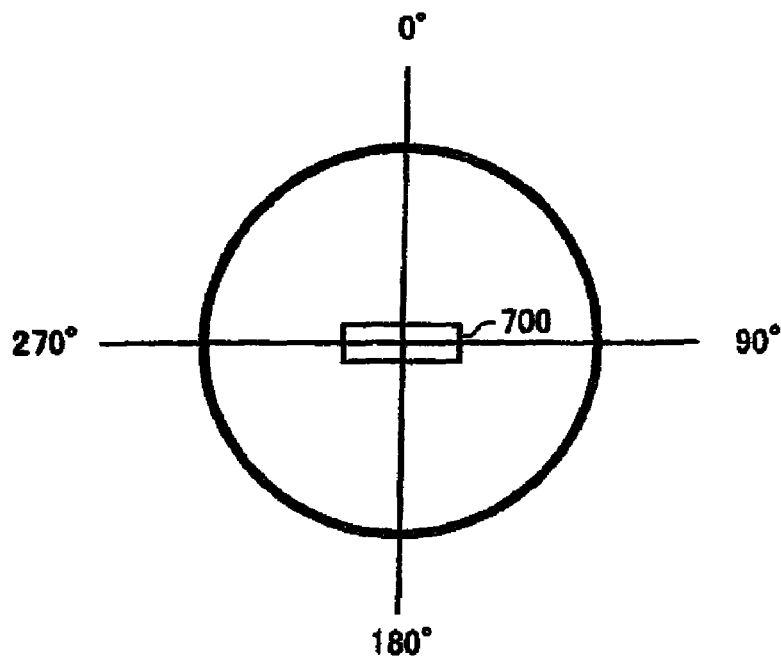
FIG. 4A is an explanatory diagram for explaining directivity of the normal microphone.

FIG. 4A is an explanatory diagram for explaining directivity of the normal microphone. The microphone 700 (normal microphone) has been arranged in such a manner that the upper plane 703 of the vibration film 702 thereof is located perpendicular to a direction of 0 degree. At this time, if a distance between the sound source and the microphone 700 (vibration film 702) is constant, even when the sound source is located in any directions, the sound pressure "pf" applied to the microphone 700 (vibration film 702) is constant. In other words, the normal microphone has such a property (omnidirectional characteristic) that the normal microphone may equally receive the sound waves which are entered from any directions.

Figure 4B:
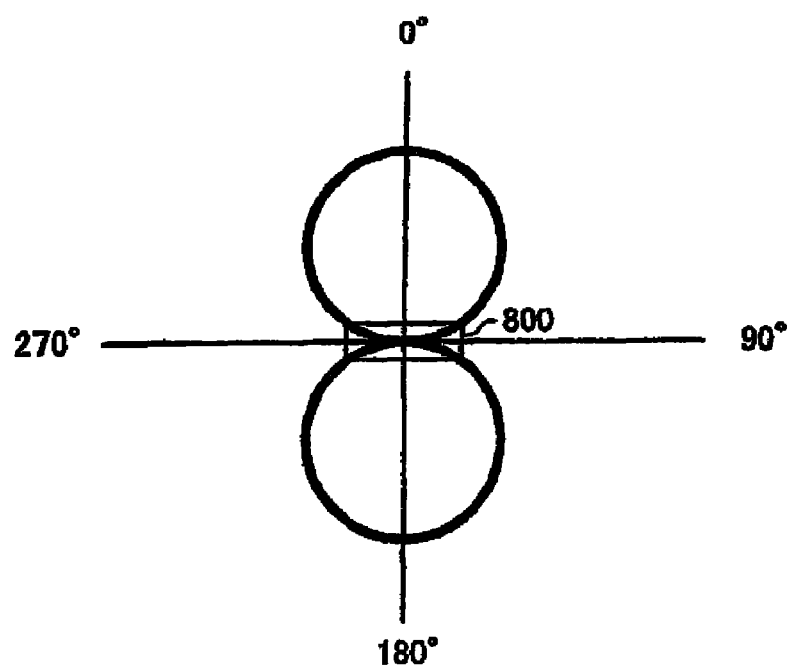
FIG. 4B is an explanatory diagram for explaining directivity of the differential microphone.

FIG. 4B is an explanatory diagram for explaining directivity of the differential microphone. The microphone 800 (differential microphone) has been arranged in such a manner that the upper plane 803 and the lower plane 805 of the vibration film 802 thereof are located perpendicular to a direction of 0 degree and a direction of 180 degrees, respectively. At this time, it a distance between the sound source and the microphone 800 (vibration film 802) is constant, when the sound source is located in a direction of either zero degree or 180 degrees, the sound pressure applied to the microphone 800 (vibration film 802) becomes maximum, whereas when the sound source is located in a direction of either 90 degrees or 270 degrees, the sound pressure "pf−pb" applied to the microphone 800 (vibration film 802) becomes minimum. In other words, the differential microphone has such a property (dual directional characteristic) that this differential microphone can easily receive the sound waves entered from the directions of zero degree and 180 degrees, and can hardly receive the sound waves entered from the directions of 90 degrees and 270 degrees.

In such a case that the microphone 800 is applied to a close-talking type sound input apparatus, voice of a user is generated from an area in the vicinity of the microphone 800 (vibration film 802). As a result, the voices of the user are largely attenuated between the upper plane 803 and the lower plane 805 of the vibration film 802, so that a large difference may appear in sound pressure of the user voices entered to both the upper plane 803 and the lower plane 805 of the vibration film 802.

In contrast to the above-described user voice, as to noise components, sound sources are located at positions separated far from the microphone 800 (vibration film 802), as compared with the sound source of the voices of the user. As a result, sound pressure of the noises is not substantially attenuated between the upper plane 803 and the lower plane 805 of the vibration film 802, so that there is substantially no difference between the sound pressure of the noise entered to the upper plane 803 and the sound pressure of the noise entered to the lower plane 805 of the vibration film 802.

As previously described, the vibration film 802 is vibrated in response to the difference between the sound pressure of the sound waves which are entered at the same time to both the upper plane 803 and the lower plane 805 of the vibration film 802. Then, since the difference between the sound pressure of the noises entered to both the upper plane 803 and the lower plane 805 of the vibration film 802 is very small, the noises are canceled with each other by the vibration film 802. To the contrary, since the difference between the sound pressure of the user voices is large which are entered to the upper plane 803 and the lower plane 805 of the vibration film 802, the voices of the user are not canceled with each other by the vibration film 802, but therefore, the user voices may vibrate the vibration film 802.

Under such a fact, in accordance with the microphone 800, it can be regarded that the vibration film 802 is vibrated only by the voices of the user. As a result, it can also be regarded that an electric signal outputted from the microphone 800 corresponds to such a signal indicative of only the user voices from which the noise component has been eliminated.

That is to say, in accordance with the differential microphone, it is possible to acquire the electric signal representative of the voices of the user, from which the noise component has been removed, with employment of the simple structure. As a consequence, generally speaking, under such an environment that there are many noises, an SNR of an output signal from a differential microphone is higher than an SNR of an output signal from a normal microphone. Accordingly, under the environment that a large number of noises are present, there are many possibilities that it the differential microphone is employed, then clearer user voices can be transferred to a counter party, as compared with the normal microphone.

On the other hand, as previously described, since an output signal of a normal microphone is larger than an output signal of a differential microphone, under such an environment (under silent environment) that noises (for instance, noise of gain amplifier) generated in an output circuit of a microphone are larger than externally applied noises, generally speaking, an SNR of an output signal from the normal microphone is higher than an SNR of an output signal from the differential microphone.

Also, will be discussed later, a gain of an output unit of a normal microphone can be set lower than that of a differential microphone, generally speaking, current consumption of the normal microphone may be lower than that of the differential microphone.

In other words, if the normal microphone and the differential microphone can be switched in response to surrounding environments under which microphones are operated, then clear user voices can be continuously transferred to counter parties irrespective of the surrounding environments, and further, useless current consumption may be reduced. The below-mentioned microphone unit and voice input apparatus, according to the present embodiment mode, have such a structure capable of functioning as a normal microphone, and also, capable of functioning as a differential microphone.

Next, a description is made of a structure of a microphone unit 1 according to the present embodiment mode.

Figure 5:
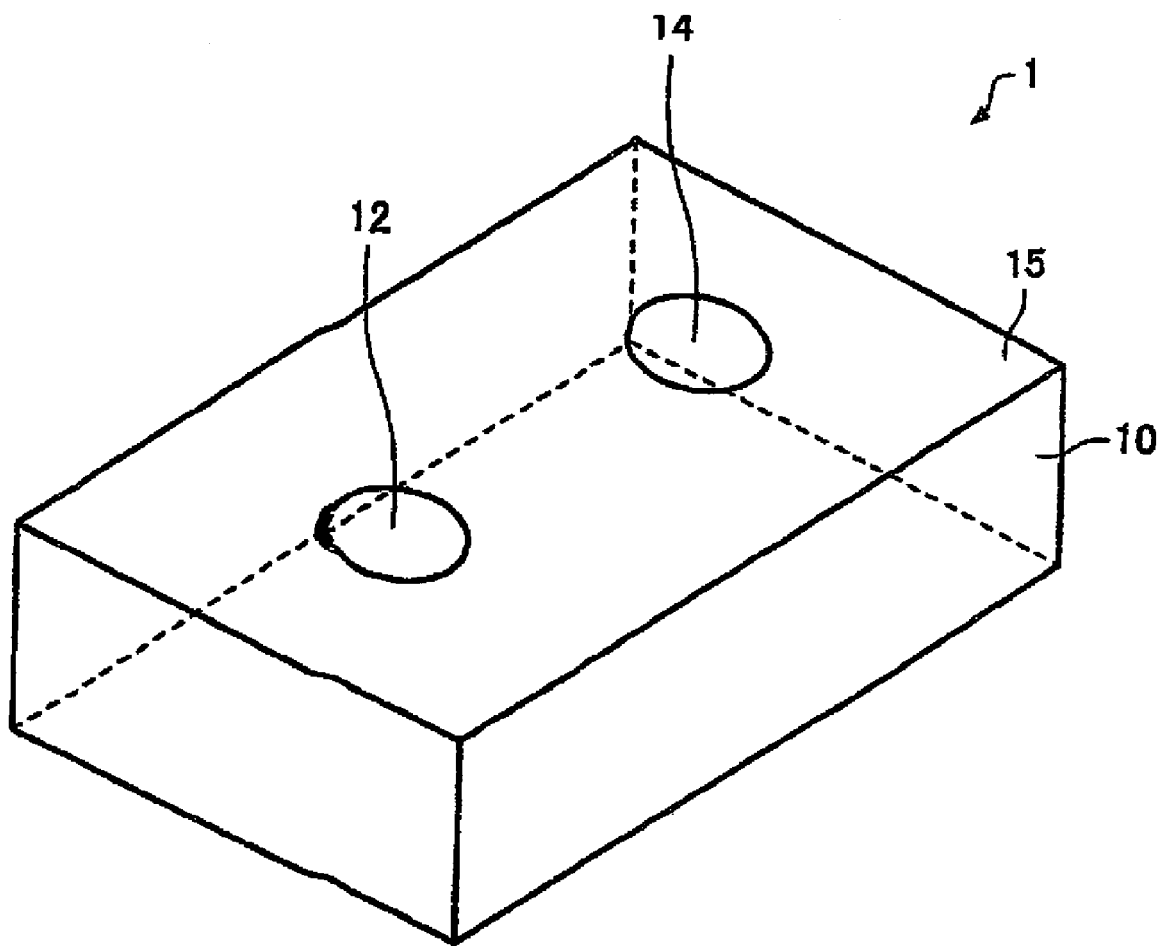
FIG. 5 is an explanatory diagram for explaining a microphone unit according to an embodiment mode of the present invention.
Figure 6A:
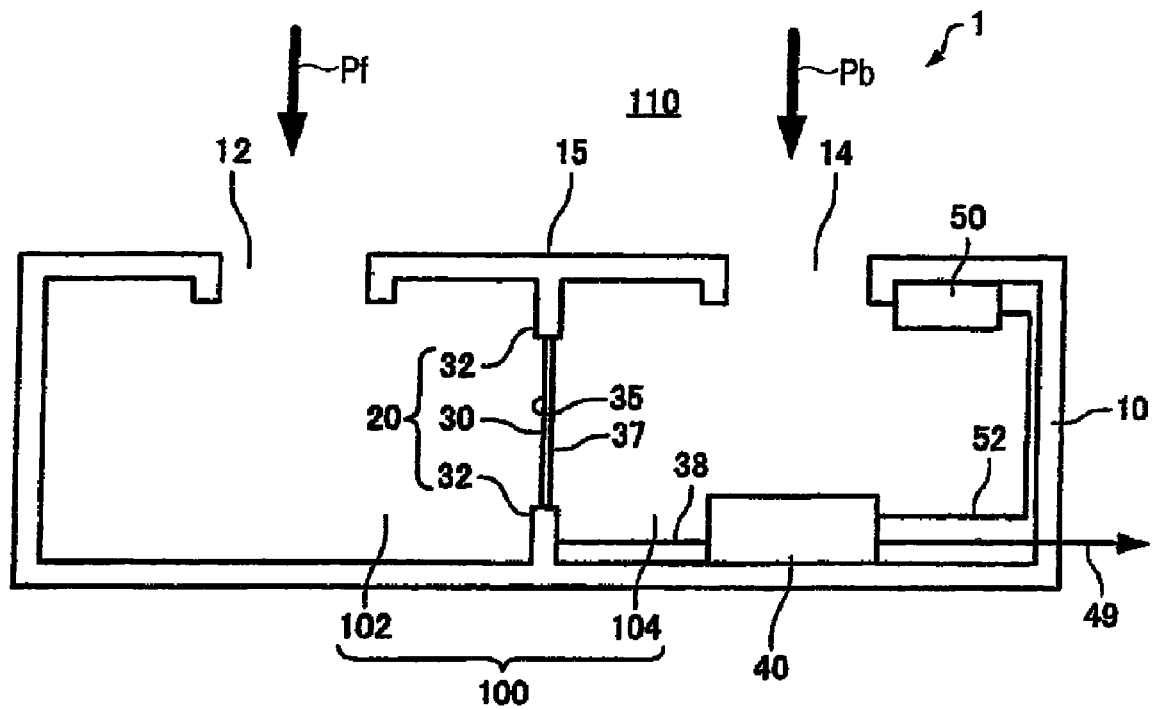
FIG. 6A and FIG. 6B are explanatory diagrams for explaining the microphone unit of the embodiment mode.

As shown in FIG. 5 and FIG. 6A, the microphone unit 1 according to the present embodiment mode contains a housing 10. The housing 10 is a member which constitutes an outer shape of the microphone unit 1. The outer shape of the housing 10 (microphone unit 1) may be made of a polyhedral structure. Alternatively, as shown in FIG. 5, the outer shape of the housing 10 may be made of a hexahedron (either rectangular parallel piped or cube). It should also be noted that the outer shape of the housing 10 may be alternatively made of any polyhedral structure other than the hexahedron. Otherwise, the outer shape of the housing 10 may be made of any structure other than the polyhedral structure, for example, a spherical structure (semi-spherical structure).

As shown in FIG. 6A, the housing 10 contains an internal space 100 (first and second spaces 102 and 104). In other words, the housing 10 has such a structure for segmenting a specific space, and an inner space 100 corresponds to a space segmented by the housing 10. Alternatively, the housing 10 may have a shielding structure (electromagnetic shielding structure) which electrically and magnetically shields the inner space 100 and an external space (outer space 110) of the housing 10. As a consequence, both a vibration film 30 (will be explained later) and an output unit 40 (will be discussed later) can be hardly influenced by an adverse influence caused by electronic components arranged in the outer space 110 of the housing 10. As a result, it is possible to provide the microphone unit capable of realizing a noise eliminating function in high precision.

Then, as shown in FIG. 5 and FIG. 6A, opening portions for communicating the inner space 100 of the housing 10 with the outer space 110 have been formed in the housing 10. In the present embodiment mode, both a first opening portion 12 and a second opening portion 14 hare been formed in the housing 10. In this case, the first opening portion 12 corresponds to such an opening portion which communicates the first space 102 with the outer space 110. Also, the second opening portion 14 corresponds to such an opening portion which communicates the second space 104 with the outer space 110. It should also be understood that the first space 102 and the second space 104 will be discussed in detail. There is no specific restriction with respect to outer shapes of the first and second opening portions 12 and 14. For example, as indicated in FIG. 5, the outer shapes of the first and second opening portions 12 and 14 may be made of circular shapes. Alternatively, the outer shapes of the first and second opening portions 12 and 14 may be made of any shapes other than the circular shapes, for example, rectangular shapes.

As indicated in FIG. 5 and FIG. 6A, in the present embodiment node, the first and second opening portion 12 and 14 have been formed in a single plane is of the housing 10 made of the hexahedral structure polyhedral structure). As a result, sound pressure of noises which are entered from the first and second opening portions 12 and 14 inside the housing 10 can be made substantially equal to each other, so that the noises can be eliminated in higher precision. It should also be noted that as a modification, the first and second opening portions 12 and 14 may be alternatively formed in different planes of a polyhedral structure respectively. For instance, the first and second opening portions 12 and 14 may be alternatively formed in planes of a polyhedral structure, which are located opposite to each other, or may be alternatively formed in planes of the polyhedral structure, which are located adjacent to each other. Also, in the present embodiment mode, one piece of the first opening portion 12 and one piece of the second opening portion 14 have been formed in the housing 10. However, the present invention is not limited only to the above-described structure. Alternatively, plural pieces of the first opening portions 12, and plural pieces of the second opening portions 14 may be formed in the housing 10.

Figure 6B:
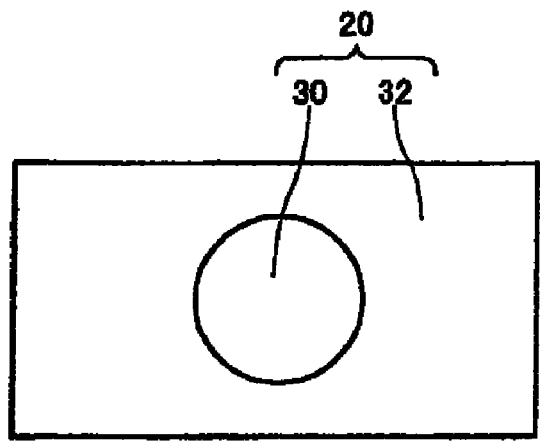

As shown in FIG. 6A and FIG. 6B, the microphone unit 1 according to the present embodiment mode has a partition member 20. In this case, FIG. 6B in such a diagram that the partition member 20 is viewed from the front plane. The partition member 20 is provided in such a manner that an inner space 100 is subdivided within the housing 10. In the present embodiment mode, the partition member 20 is provided in such a manner that the inner space 100 is subdivided into a first space 102 and a second space 104. In other words, it can be regarded that the first space 102 and the second space 104 correspond to spaces segmented by the housing 10 and the partition member 20.

Alternatively, the partition member 20 may be provided in such a manner that a medium capable of propagating sound waves is not moved (cannot be moved) between the first space 102 and the second space 104. For example, the partition member 20 may be alternatively made of an airtight bulkhead which separates the inner space 100 (first and second spaces 102 and 104) within the housing 10 in an air tight manner.

As indicated in FIG. 6A and FIG. 6B, at least a portion of the partition member 20 has been formed by a vibration film 30. The vibration film 30 corresponds to such a member which is vibrated along a normal direction when sound waves are entered to this member. Then, in the microphone unit 1, since an electric signal 38 is extracted based upon vibrations of the vibration film 30, an electric signal indicative of voices entered to the vibration film 30 is acquired. In other words, the vibration film 30 may be realized by such a vibration film of a microphone (namely, electric/acoustic transducer for transuding acoustic signal into electric signal). Also, the vibration film 30 has a first plane 35 and a second plane 37. The first plane 35 is such a plane faced with the first space 102, and the second plane 37 is such a plane faced with the second space 104.

Under such a condition that the first opening portion 12 and the second opening portion 14 have been opened, sound waves from a sound source are entered to the first plane 35 and the second plane 37 of the vibration film 30, so that the sound pressure "pf" and "pb" are applied to the first plane 35 and the second plane 37 of the vibration film 30, respectively. In other words, the above-described microphone unit 1 may function as a differential microphone similar to the microphone 800 shown in FIG. 1B.

When the first opening portion 12 and the second opening portion 14 are brought into an open status and a close status by closing the second opening portion 14 by using, for example, a finger of a user, the sound waves from the sound source are entered to the first plane 35 of the vibration film 30, so that the sound pressure "pf" is applied to the first plane 35 of the vibration film 30. Similarly, when the first opening portion 12 and the second opening portion 14 are brought into a close status and an open status by closing the first opening portion 12 by using, for example, the finger of the user, the sound waves from the sound source are entered to the second plane 37 of the vibration film 30, so that the sound pressure "pb" is applied to the second plane 37 of the vibration film 30. In other words, the above-described microphone unit 1 may function as a normal microphone similar to the microphone 700 shown in FIG. 1A.

As represented in FIG. 6A, the microphone unit 1 according to the present embodiment mode contains an output unit 40 which gives a gain to the electric signal 38 in response to the vibrations of the vibration film 30 and then, outputs an output signal 49.

Similar to the description made in FIG. 3, the sound pressure level (namely, pf−pb) which is applied to the vibration film 30 when the microphone unit 1 functions as the differential microphone is lower than the sound pressure level (namely, either "pf" or "pb") which is applied to the vibration film 30 when the microphone unit 1 functions as the normal microphone. As a consequence, when the microphone unit 1 functions as the differential microphone, the voltage level of the electric signal 38 becomes lower than the voltage level of the electric signal 38 when the microphone unit 1 functions as the normal microphone.

Under such a circumstance, under such a status that both the first opening portion 12 and the second opening portion 14 have been opened (under status that microphone unit 1 functions as differential microphone), the output unit 40 gives a higher gain to the electric signal 38 so as to output the converted output signal 49, as compared with the gain applied to the electric signal 30 under such a status that either the first opening portion 12 or the second opening portion 14 has been closed (namely, under status that microphone unit 1 functions as normal microphone).

When one status under which either the first opening portion 12 or the second opening portion 14 has been closed is changed into another status under which both the first opening portion 12 and the second opening portion 14 have been opened, the output unit 40 may alternatively give a higher gain to the electric signal 38.

Also, when one status under which both the first opening portion 12 and the second opening portion 14 have been opened is changed into another status under which either the first opening portion 12 or the second opening portion 14 has been closed, the output unit 40 may alternatively give a lower gain to the electric signal 38.

Moreover, when one status under which either the first opening portion 12 or the second opening portion 14 has been closed is changed into another status under which both the first opening portion 12 and the second opening portion 14 have been opened, the output unit 40 may alternatively increase a gain to be applied to the electric signal 38, whereas when one status under which both the first opening portion 12 and the second opening portion 14 have been opened is changed into another status under which either the first opening portion 12 or the second opening portion 24 has been closed, the output unit 40 may alternatively decrease a gain to be applied to the electric signal 38. Alternatively, at least a portion of the output unit 40 may be formed within the inner space 100 of the housing 10.

The output unit 40 may be alternatively formed on an inner wall plane of the housing 10. In other words, in accordance with the present embodiment mode, the housing 10 may be alternatively utilized as a circuit board of an electric circuit.

Alternatively, the microphone unit 1 according to the present embodiment mode may be equipped with a detecting unit 50, while the detecting unit 50 detects such a status that both the first opening portion 12 and the second opening portion 14 have been opened, otherwise, another status that either the first opening portion 12 or the second opening portion 14 has been closed.

Alternatively, the output unit 40 may switch a gain which is applied to the electric signal 38 based upon the detection result of the detecting unit 50. For example, in such a case that based upon a detection signal 52 of the detecting unit 50, the output unit 40 judges such a status that both the first opening portion 12 and the second opening portion 14 have been opened, the output unit 40 may apply a higher gain to the electric signal 38 so as to output the output signal 49, as compared with the gain applied in another status that either the first opening portion 12 or the second opening portion 14 has been closed.

At least, a portion of the detecting unit 50 may be alternatively formed within the inner space 100 of the housing 10. For example, the detecting unit 50 may be alternatively formed on the inner wall plane of the housing 10. Also, at least, a portion of the detecting unit 50 may be alternatively formed within the outer space 110 of the housing 10. For example, the detecting unit 50 may be alternatively formed on the outer wall plane of the housing 10.

It should also be understood that as the microphone (vibration film 30) according to the present embodiment mode, such a capacitor type microphone (vibration films 702 and 802) as described in FIG. 1A and FIG. 1B may be applied.

It should also be understood that the microphone unit 1 (vibration film 30) which may be applied to the present invention is not limited only to a capacitor type microphone but any other microphones known in the technical field may be alternatively applied thereto. For instance, the vibration film 30 may be realized by vibration films contained in various sorts of microphones such as a dynamic type microphone, an electro-magnetic type microphone, and a piezoelectric (crystal) type microphone.

Otherwise, the vibration film 30 may be alternatively made of a semiconductor film (for example, silicon film). In other words, the vibration film 30 may be made of a vibration film of a silicon microphone (Si microphone). Since such a silicon microphone is utilized, a microphone unit may be made compact and may realize high performance.

The outer shape of the vibration film 30 is not especially restricted. As shown in FIG. 6B, the outer shape of the vibration film 30 may be alternatively made of a circular shape. At this time, the vibration film 30, and the first and second opening portions 12 and 14 may be made of circular shapes whose diameters are substantially equal to each other. It should also be noted that the dimension of the vibration film 30 may be made larger, or smaller than the dimensions of the first and second opening portions 12 and 14.

It should also be noted that in the present embodiment mode, as shown in FIG. 6A, the vibration film 30 may be alternatively provided in such a manner that a normal is extended parallel to the plane 15 of the housing 10. That is to say, the vibration film 30 may be alternatively provided in such a manner that the vibration film 30 is intersected perpendicular to the plane 15. Then, alternatively, the vibration film 30 may be arranged at an intermediate portion between the first and second opening portions 12 and 14. As a modification, the vibration film 30 may be arranged beside (in the vicinity of) the second opening portion 14, which is not shown. That is to say, the vibration film 30 may be alternatively arranged in such a manner that a distance defined from the first opening portion 12 is not equal to another distance defined from the second opening portion 14.

In accordance with the present embodiment mode, as shown in FIG. 6A and FIG. 6B, the partition member 20 may alternatively contain a holding portion 32 which holds the vibration film 30. Then, the holding portion 32 may be tightly adhered to the inner wall plane of the housing 10. Since the holding portion 32 is tightly adhered to the inner wall plane of the housing 10, the first and second spaces 102 and 104 may be air-tightly separated form each other.

Figure 7:
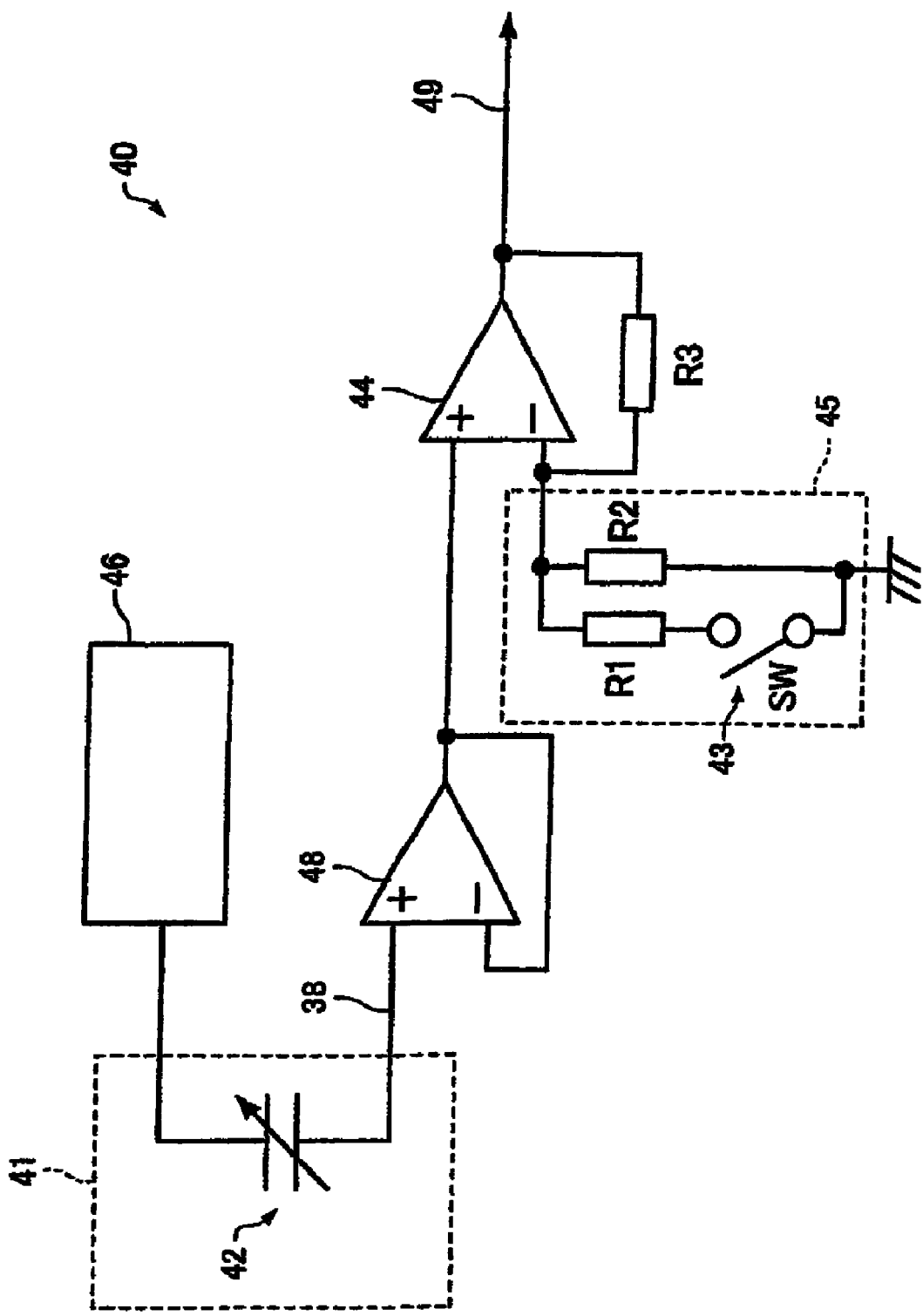
FIG. 7 is a circuit diagram for showing an output unit 40 of the microphone unit of the embodiment mode.

FIG. 7 shows one example of the output unit 40 which can be applied to the present embodiment mode. The output unit 40 has been arranged in such a manner that the electric signal 38 produced based upon a change in capacitances of a capacitor 42 (namely, capacitor type microphone having vibration film 30) is amplified by a signal amplifying circuit 44, and then, the amplified electric signal 38 is outputted as the output signal 49.

For example, the output unit 40 contains a gain switching circuit 45. The gain switching circuit 45 plays a role capable of switching amplification factors (gains) of the signal amplifying circuit 44 by turning ON, or OFF a switch 43, That is, when the switch 43 is turned OFF, a gain of the signal amplifying unit 44 is R3/R2+1, whereas when the switch 43 is turned ON, a gain thereof is R3×(R1+R2)/R1×(R2+1). In other words, the gain obtained when the switch 43 is turned ON is higher than the gain obtained when the switch 43 is turned OFF.

As previously described, the voltage level of the electric signal 38 when the microphone unit 1 functions as the differential microphone becomes lower than the voltage level thereof when the microphone unit 1 functions as the normal microphone. As a consequence, the output unit 40 (gain switching circuit 45) turns ON the switch 43 when the first opening portion 12 and the second opening portion 14 have been under open status (namely, microphone unit 1 is under such a status that this microphone unit 1 functions as differential microphone), whereas the output unit 40 (gain switching circuit 45) turns OFF the switch 43 when either the first opening portion 12 or the second opening portion 14 has been under close status (namely, microphone unit 1 is under such a status that this microphone unit 1 functions as normal microphone). As a result, when the microphone 1 functions as the differential microphone, the output unit 40 can apply the higher gain than that when the microphone unit 1 functions as the normal microphone to the electric signal 38 so as to output the output signal 49. As a result, if the gains determined by resistance values R1, R2, R3 are properly selected, then the voltage levels of the output signals 49 can be kept substantially constant even when the microphone unit 1 functions as the normal microphone, and also, as the differential microphone. As a consequence, it is possible to avoid that since the sound volume is rapidly changed, communications of the counter party can be hardly heard.

Alternatively, the gain switching circuit 45 may be provided inside the housing 10, or outside the housing 10. For instance, the capacitor 42 may alternatively constitute a portion of the vibration film unit 41. It should also be noted that the output unit 40 may be arranged by containing a charge pump circuit 46 and an operational amplifier 48 (voltage follower). As a result, the change in the capacitances of the capacitor 42 can be precisely acquired. In the present embodiment mode, for instance, the capacitor 42, the signal amplifying circuit 44, the charge pump circuit 46, and the operational amplifier 48 may be alternatively formed on the inner wall plane of the housing 10.

In such a case that a silicon microphone is applied as the vibration film 30, the output unit 40 may be realized by an integrated circuit manufactured in the semiconductor substrate of the silicon microphone.

Also, alternatively, the output unit 40 may further contain a converting circuit for converting an analog signal into a digital signal, a compressing circuit for compressing (coding) the digital signal.

Next, a description is made of a structure of a microphone unit 1' according to the present embodiment of the present invention.

Figure 8:
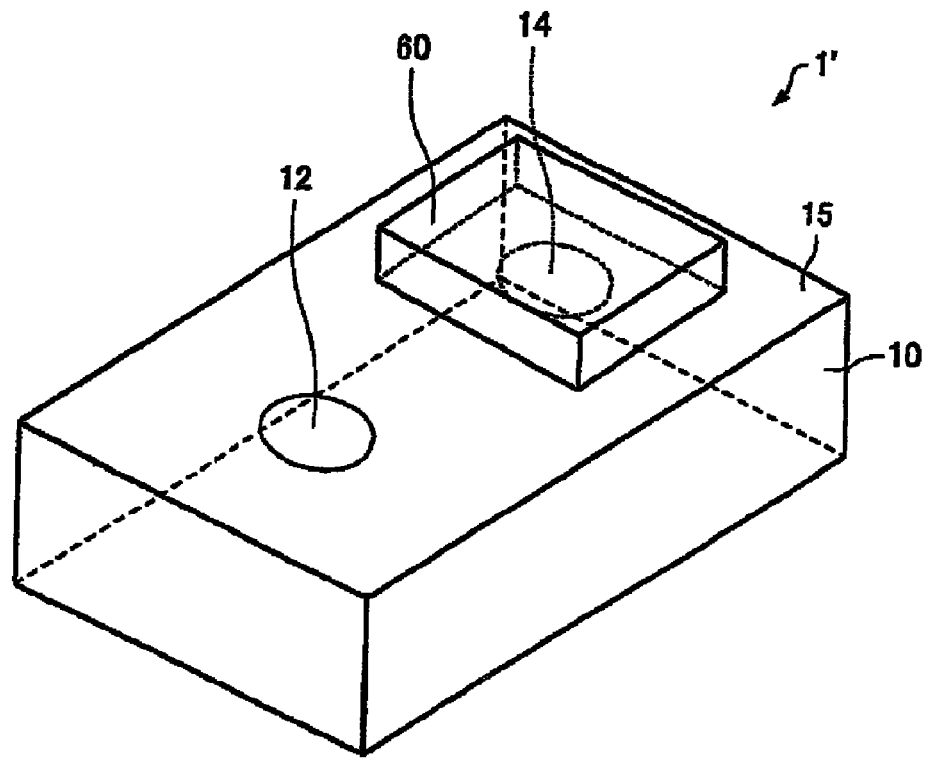
FIG. 8 is an explanatory diagram for explaining a microphone unit according to another embodiment mode of the present invention.
Figure 9:
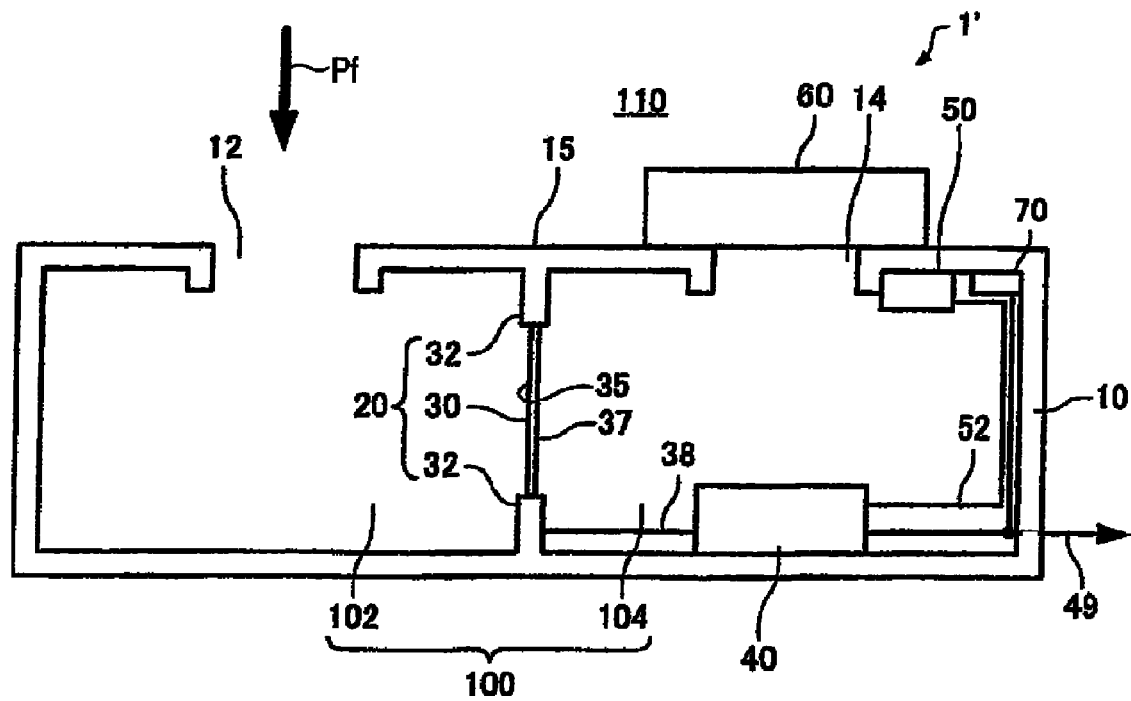
FIG. 9 is an explanatory diagram for explaining a microphone unit according to another embodiment mode of the present invention.
Figure 10:
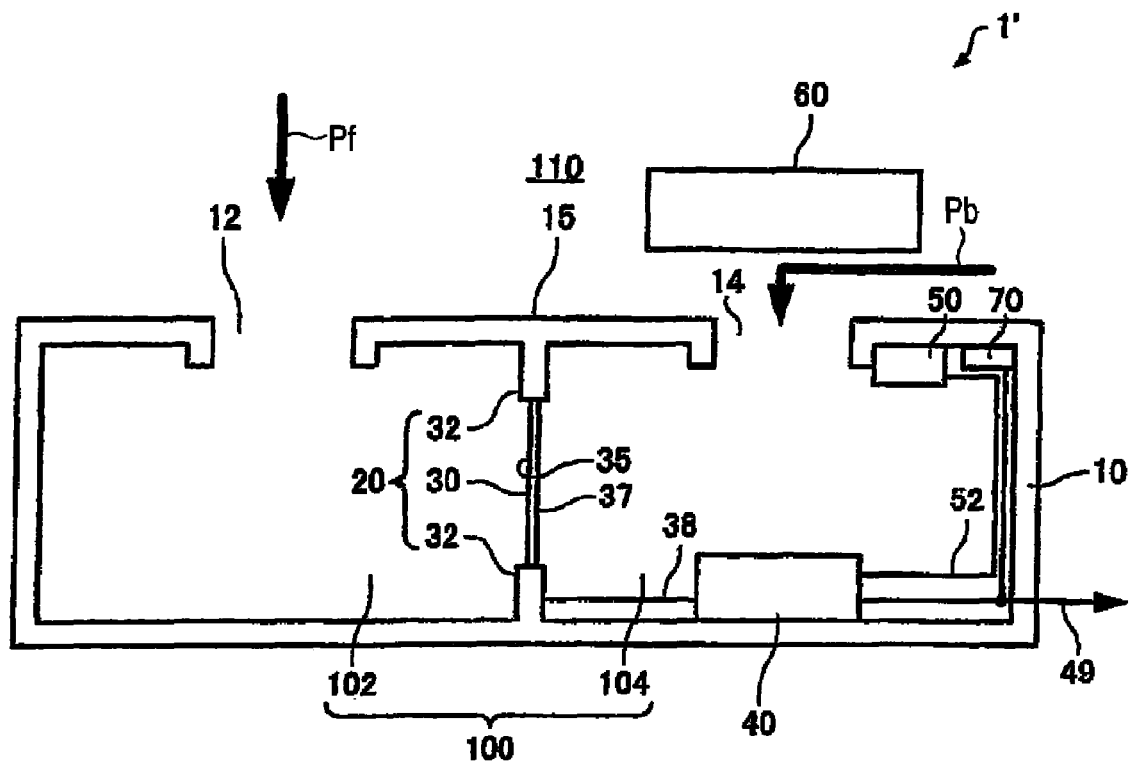
FIG. 10 is an explanatory diagram for explaining a microphone unit according to another embodiment mode of the present invention.

As represented in FIG. 8 to FIG. 10, the microphone unit 1' according to the present embodiment node has such a structure that an opening/closing mechanism 60 (lid portion) has been additionally provided in the above-described microphone unit 1. While the opening/closing mechanism 60 has been mounted on an upper portion of the second opening portion 14, the opening/closing mechanism 60 sets the second opening portion 14 to either an open status or a close status in response to open/close condition thereof. FIG. 9 shows the microphone unit 1' under such a status that the open/close mechanism 60 has been closed. FIG. 10 indicates the microphone unit 1' under such a status that the open/close mechanism 60 has been opened.

In the microphone unit 1, since such a mechanism corresponding to the open/close mechanism 60 is not provided, this microphone unit 1 can be utilized as either the normal microphone or the differential microphone by such a manner that the user closes either the first opening portion 12 or the second opening portion 14 by her finger, or the like. As a result, when the microphone unit 1 is utilized as the normal microphone, the user talks a conversation while the user must close either the first opening portion 12 or the second opening portion 14.

On the other hand, since the microphone unit 1' is equipped with the open/close mechanism 60, the user may merely perform a manipulation of opening/closing the opening/closing mechanism 60 before the user talks a conversation. The opening/closing mechanism 60 may be realized by such a mechanism which is manually opened/closed by the user.

Alternatively, for instance, the opening/closing mechanism 60 may be realized by that since the user depresses a predetermined button, the opening/closing mechanism 60 may be opened/closed.

It should also be noted that while the opening/closing mechanism 60 may be mounted on an upper portion of the first opening portion 12, the opening/closing mechanism 60 may set the first opening portion 12 to either an open status or a close status in response to open/close condition thereof.

Alternatively, the microphone unit 1' may contain an open/close control unit 70. The open/close control unit 70 controls the open/close condition of the opening/closing mechanism 60 in response to a sound volume of a talking person.

Alternatively, the open/close control unit 70 may predict a sound volume of a talking person based upon a voltage level of the output signal 49 of the output unit 40.

Further, the open/close control unit 70 may compare a sound volume of a talking person with a predetermined reference value, and thereafter, may control the open/close condition of the opening-closing mechanism 60 based upon a comparison result. Alternatively, the open/close control unit 70 may control the open/close condition of the opening/closing mechanism 60 based upon a change in sound volumes of the talking person which were measured during a predetermined time period in the past.

Alternatively, the open/close control unit 70 may control the open/close condition of the opening/closing mechanism 60 based upon a sound volume of a talking person and the present open/close condition of the opening/closing mechanism 60. For example, under such a status that the opening/closing mechanism 60 has been closed, when the sound volume of the talking person is rapidly increased, since it is possible to predict that the present environment is changed into such an environment that noises are increased, the open/close control unit 70 may control the opening/closing mechanism 60 to be opened. Also, for example, under such a status that the opening/closing mechanism 60 has been opened, when the sound volume of the talking person is rapidly decreased, since it is possible to predict that the present environment is changed into such an environment that noises are decreased, the open/close control unit 70 may control the opening/closing mechanism 60 to be closed.

Next, a description is made of a structure of a microphone unit 2 according to the present embodiment of the present invention.

Figure 11:
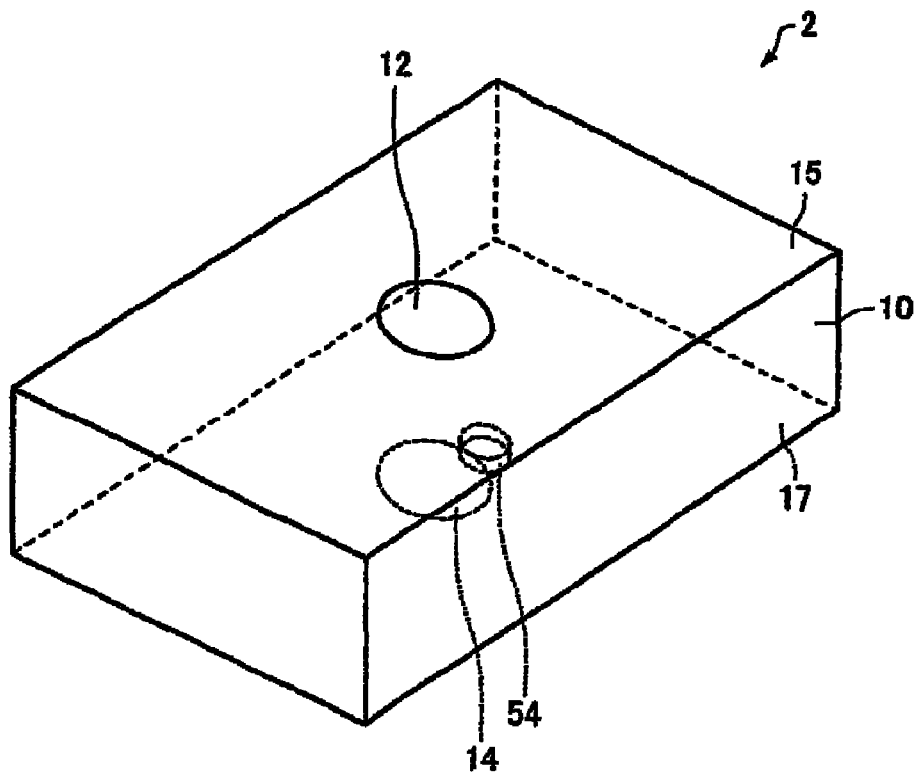
FIG. 11 is an explanatory diagram for explaining a microphone unit according to another embodiment mode of the present invention.
Figure 12:
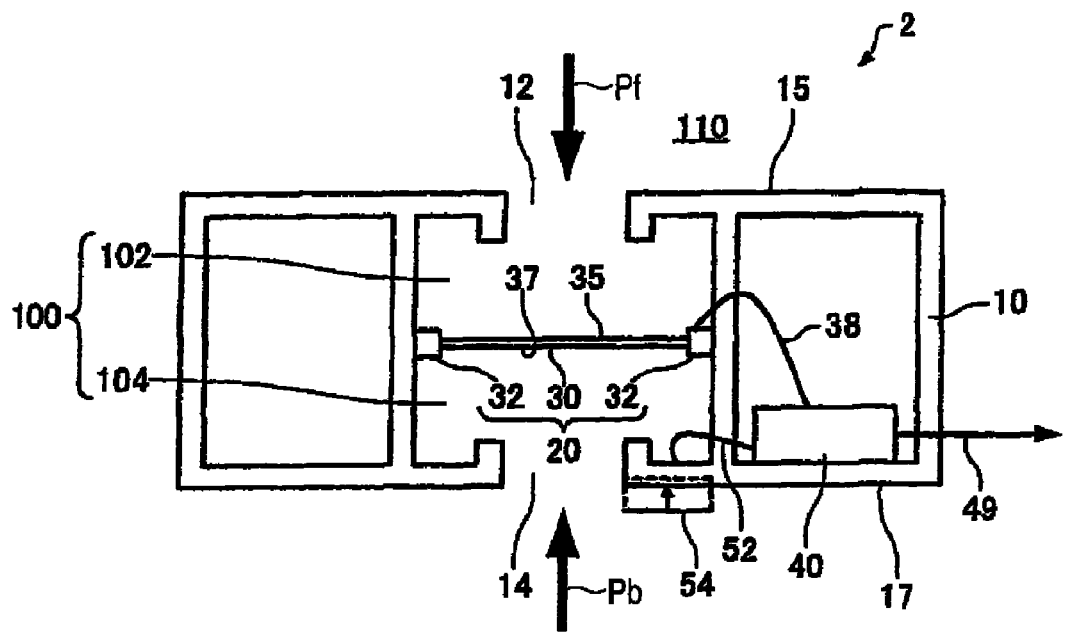
FIG. 12 is an explanatory diagram for explaining a microphone unit according to another embodiment mode of the present invention.

As shown in FIG. 11 and FIG. 12, the microphone unit 2 according to the present embodiment mode contains a housing 10, a first opening portion 12, a second opening portion 14, a partition member 20 (including vibration film 30 and holding portion 32), and an output unit 40 similar to the above-described microphone unit 1. Then, in the present embodiment mode, as represented in FIG. 11 and FIG. 12, the first opening portion 12 has been formed in one plane 15 of the housing 10 which constructs a hexahedral structure (namely, polyhedral structure). Also, the second opening portion 14 has been formed in another plane 17 located opposite to the above-described plane IS.

When the second opening portion 14 is under open status, sound waves from a sound source are entered to a first plane 35 and a second plane 36 of the vibration film 30, so that sound pressure "pf" and sound pressure "pb" are applied to the first plane 35 and the second plane 37 of the vibration film 30, respectively. In other words, the microphone unit 2 functions as a differential microphone similar to the microphone 800 shown in FIG. 1B.

When the second opening portion 14 is brought into a close status by closing the second opening portion 14 by using, for example, a finger of a user, sound waves from the sound source are entered to the first plane 35 of the vibration film 30, so that the sound pressure "pf" is applied to the first plane 35 of the vibration film 30. In other words, the microphone unit 2 functions as a normal microphone similar to the microphone 700 shown in FIG. 1A.

In the present embodiment mode, a switch 54 has been additionally provided in the microphone unit 2. Since the switch 54 has been arranged adjacent to the second opening portion 14, if the user closes the second opening portion 14 by her finger, or the like, then the switch 54 is brought into a depressed status (turned ON). In other words, the switch 54 detects whether the second opening portion 14 is under open status, or under close status so as to output a detection signal 52, so that this switch 54 functions as the detection unit 50 of the above-described microphone unit 1.

In such a case that the output unit 40 judges that the second opening portion 14 is under open status based upon the detection signal 52 (when microphone unit 2 functions as differential microphone), the output unit 40 applies a higher gain to the electric signal 38 to output the output signal 49, while this gain is higher than another gain given in such a case that the output unit 40 judges that the second opening portion 14 is under close status based upon the detection signal 52 (when microphone unit 2 functions as normal microphone).

It should also be noted that while the switch 54 may be arranged adjacent to the first opening portion 12, the switch 54 may alternatively detect whether the first opening portion 12 is under open status, or under close status so as to output the detection signal 52.

Next, a description is made of a structure of a microphone unit 2' according to the present embodiment of the present invention.

Figure 13:
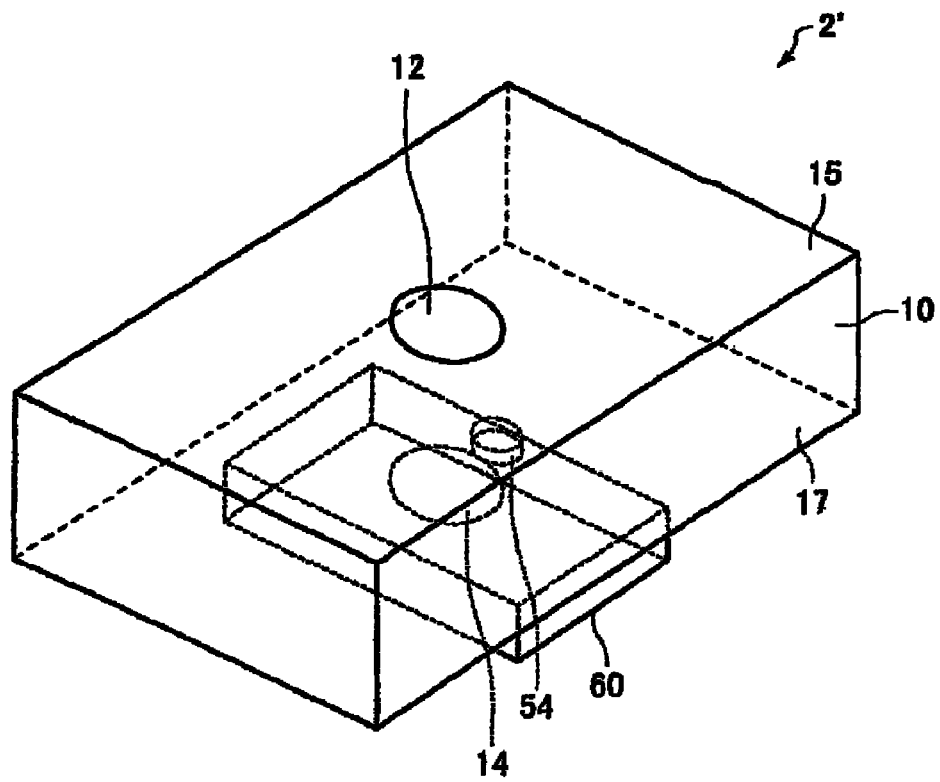
FIG. 13 is an explanatory diagram for explaining a microphone unit according to another embodiment mode of the present invention.
Figure 14:
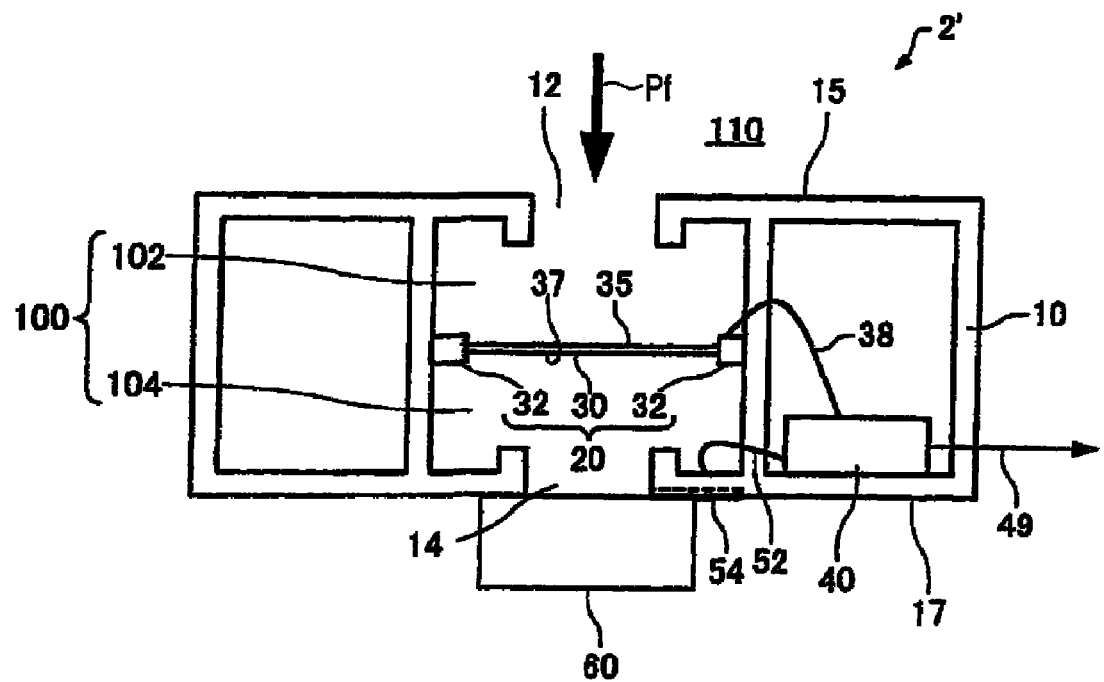
FIG. 14 is an explanatory diagram for explaining a microphone unit according to another embodiment mode of the present invention.
Figure 15:
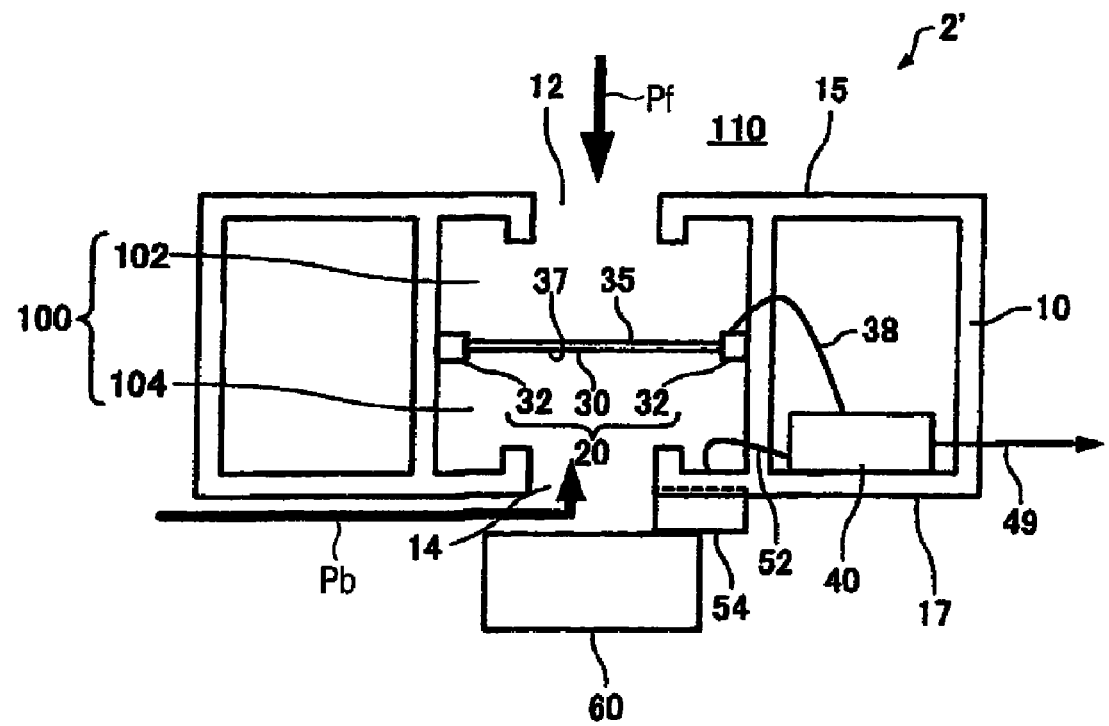
FIG. 15 is an explanatory diagram for explaining a microphone unit according to another embodiment mode of the present invention.

As represented in FIG. 13 to FIG. 15, the microphone unit 2' according to the present embodiment node has such a structure that an opening/closing mechanism 60 (lid portion) has been additionally provided in the above-described microphone unit 2. While the opening/closing mechanism 60 has been mounted on an lower portion of the second opening portion 14, the opening/closing mechanism 60 sets the second opening portion 14 to either an open status or a close status in response to open/close condition thereof. FIG. 14 shows the microphone unit 2' under such a status that the open/close mechanism 60 has been closed. FIG. 15 indicates the microphone unit 2' under such a status that the open/close mechanism 60 has been opened.

In the microphone unit 2', when the open/close mechanism 60 is closed, the switch 54 is brought into a depressed condition (turn ON), whereas when the open/close mechanism 60 is opened, the switch 54 is brought into an undepressed condition (turn OFF).

In such a case that the output unit 40 judges that the second opening portion 14 is under open status based upon the detection signal 52 (when microphone unit 2 functions as differential microphone), the output unit 40 applies a higher gain to the electric signal 38 to output the output signal 49, while this gain is higher than another gain given in such a case that the output unit 40 judges that the second opening portion 14 is under close status based upon the detection signal 52 (when microphone unit 2 functions as normal microphone).

In the above-described microphone unit 2, since such a mechanism corresponding to the open/close mechanism 60 is not provided, this microphone unit 2 can be utilized as either the normal microphone or the differential microphone by such a manner that the user closes either the first opening portion 12 or the second opening portion 14 by her finger, or the like. As a result, when the microphone unit 2 is utilized as the normal microphone, the user talks the conversation while the user must close either the first opening portion 12 or the second opening portion 14.

On the other hand, since this microphone unit 2 is equipped with the open/close mechanism 60, the user may merely perform a manipulation of opening/closing the opening/closing mechanism 60 before the user talks a conversation. The opening/closing mechanism 60 may be realized by such a mechanism which is manually opened/closed by the user. Alternatively, for instance, the opening/closing mechanism 60 may be realized by that since the user depresses a predetermined button, the opening/closing mechanism 60 may be opened/closed.

It should also be noted that while the opening/closing mechanism 60 may be alternatively mounted on an upper portion of the first opening portion 12, the opening/closing mechanism 60 may alternatively set the first opening portion 12 to either an open status or a close status in response to open/close condition thereof.

The microphone units 1, 1', 2, and 2', according to the present embodiment mode, may be alternatively arranged in the above-described manners. In accordance with the above-described microphone units 1, 1', 2, and 2', the high-precision noise eliminating function can be realized with employment of the simple structures. In the below-mentioned description, as to basic ideas capable of eliminating noises of the microphone units 1, 1', 2, and 2', are basic noise eliminating idea of the microphone unit 1 will be explained as a typical example. It should be understood that this basic noise eliminating idea of the microphone unit 1 may be similarly applied to the remaining microphone units 1', 2, and 2'.

Firstly, a description is made of a basic idea about vibrations of the vibration film 30, which is conducted based upon the structure of the microphone unit 1.

In the present embodiment mode, under such a status that both the first opening portion 12 and the second opening portion 14 have been opened (namely, status under which microphone unit 1 functions as differential microphone), the vibration film 30 receives sound pressure from both sides (first and second planes 35 and 37). As a consequence, when two sets of sound pressure having the same magnitudes are applied to both sides of the vibration film 30, two sets of the sound pressure are canceled with each other by the vibration film 30, so that two sets of the sound pressure do not constitute force capable of vibrating the vibration film 30. Conversely, when there is a difference between two sets of sound pressure received by both sides of the vibration film 30, this vibration film 30 is vibrated in response to the difference between the sound pressure.

Also, two sets of the sound pressure of the sound waves entered to the first and second opening portions 12 and 14 are uniformly transferred to the inner wall planes of the first and second spaces 102 and 104 (Pascal's principle). As a result, the plane (first plane 35) which is faced to the first space 102 of the vibration film 30 receives such a sound pressure equal to the sound pressure entered to the first opening portion 12, whereas the plane (second plane 37) which is faced to the second space 104 of the vibration film 30 receives such a sound pressure equal to the sound pressure entered to the second opening portion 14.

In other words, the sound pressure received by the first plane 35 and the sound pressure received by the second plane 37 correspond to the sound pressure of the sound entered to the first opening portion 12 and the sound pressure of the sound entered to the second opening portion 14, respectively. The vibration film 30 is vibrated based upon the difference between two sets of the sound pressure of the sound waves which are entered to the first plane 35 and the second plane 37 (namely, first and second opening portions 12 and 14).

As previously explained, the sound pressure (amplitudes of sound waves) is rapidly attenuated at a position close to the sound source, and the further the position is separated from the sound source, the gentler the sound pressure is attenuated.

In such a case that the microphone unit 1 is applied to a close-talking type voice input apparatus, a user produces voices from a position located close to the microphone unit 1 (first and second opening portions 12 and 14). As a result, the voices of the user are largely attenuated between the first opening portion 12 and the second opening portion 14, so that a large difference may appear in strengths of the user voices entered to the first and second opening portions 12 and 14, namely, a large difference may be present in the sound pressure of the user voices entered to the first and second plane 35 and 37.

In contrast to the above-described user voices, as to the noise component the sound source thereof is remotely located from the microphone unit 1 (first and second opening portions 12 and 14). As a result, sound pressure of the noises is not substantially attenuated between the first and second opening portions 12 and 14, but substantially no difference may be present between the sound pressure of the noise entered to the first opening portion 12 and the sound pressure of the noise entered to the second opening portion 14.

As previously explained, the vibration film 30 is vibrated based upon the difference in the sound pressure of the sound waves which are entered to the first and second plane 35 and 37. Then, the difference in the sound pressure of the noises entered to the first and second planes 35 and 37 is very small, so that these noises are canceled with each other by the vibration film 30. To the contrary, since the difference in the sound pressure of the user voices entered to the first and second planes 35 and 37 is large, the user voices are not canceled with each other by the vibration film 30, so that the user voices may vibrate the vibration film 30.

As apparent from the above-described fact, in accordance with the microphone unit 1, it can be regarded that the vibration film 30 is vibrated based upon only the voices of the user. Accordingly, it is possible to stated that the electric signal 49 outputted from the microphone unit 1 (output unit 40) can be regarded as such an electric signal indicative of only the voices of the user, from which the noise components have been eliminated.

In other words, in accordance with the microphone unit 1 of the present embodiment mode, a voice input apparatus having a simple structure can be provided, while the voice input apparatus can acquire an electric signal indicative of a user voice, from which noise has been eliminated.

Although the microphone unit 1 will be exemplified in the below-mentioned description, the technical idea may be similarly applied to the microphone unit 1', 2, and 2'.

As previously described, in accordance with the microphone unit 1, under such a status that the first opening portion 12 and the second opening portion 14 have been opened (namely, under such a status that microphone unit 1 functions as differential microphone), this microphone unit 1 can acquire the electric signal indicative of only the user voice from which the noise component has been eliminated. It should also be noted that sound waves have contained phase components. As a consequence, if a consideration is made of a difference between phases of sound waves which are entered to the first opening portion 12 and the second opening portion 14 (namely, first and second planes 35 and 37 of vibration film 30), then it is possible to conduct conditions capable of realizing a noise eliminating function in higher precision (namely, designing condition of microphone unit 1). Next, a description is made of conditions which should be satisfied by the microphone unit 1 in order to realize the noise eliminating function in the higher precision.

As previously described, in accordance with the microphone 1, such a signal outputted based upon sound pressure (namely, difference between sound pressure received by first plane 35 and sound pressure received by second plane 37: this pressure difference will be properly referred to as "differential sound pressure" herein after) which vibrates the vibration film 30 is regarded as a signal indicative of a user voice. In accordance with the microphone unit 1, it a noise component contained in the sound pressure (differential sound pressure) which vibrates the vibration film 30 becomes smaller than such a noise component contained in sound pressure which is entered to either the first plane 35 or the second plane 37, then this fact can be evaluated as such that the noise eliminating function is realized. Precisely speaking, if a noise strength ratio becomes a user voice strength ratio, then this fact can be evaluated as such that the noise eliminating function is realized. The above-described noise strength ratio indicates a ratio of a strength of the noise component contained in the differential sound pressure with respect to a strength of the noise component contained in the sound pressure which is entered to either the first plane 35 or the second plane 37. The above-explained user voice strength ratio represents a ratio of a strength of the user voice component contained in the differential sound pressure with respect to a strength of the user voice component contained in the sound pressure which is entered to either the first plane 35 or the second plane 37.

A description is made of concrete conditions which should be satisfied by the microphone unit 1 (housing 10) in order to realize this noise eliminating function.

First of all, sound pressure of voices will now be considered which are entered to the first plane 35 and the second plane 37 (first opening portion 12 and second opening portion 14) of the vibration film 30. Assuming now that a distance from the sound source of the user voices to the first opening portion 12 is defined as "R" and a distance between centers of the first and second opening portions 12 and 14 is defined as "Δr", if the phase difference is neglected, then sound pressure (strength) "P(S1)" and sound pressure (strength) "PS2" of the user voices which are entered to the first and second opening portions 12 and 14 can be expressed by the following formula (2):

$$P(S1)=K \times 1/R \quad \text{- - - (2)}$$

$$P(S2)=K \times 1/(R+\Delta r) \quad \text{- - - (3)} \qquad \text{[Formula 2]}$$

As a consequence, when the phase difference of the user voices is neglected, a user voice strength ratio "ρ(P)" is expressed by the below-mentioned formula (4), while the user voice strength ratio "ρ(P)" indicates such a ratio of the strength of the user voice component contained in the differential sound pressure with respect to the strength of the sound pressure of the user voice entered to the first plane 35 (first opening portion 12):

$$\rho(P)=[P(S1)-P(S2)]/P(S1)=\Delta r/(R+\Delta r) \quad \text{- - - (4)} \qquad \text{[Formula 3]}$$

In this case, in such a case that the microphone unit 1 is utilized in a close-talking type voice input apparatus, it can be regarded that the center-to-center distance "Δr" is sufficiently small, as compared with the distance "R."

As a consequence, the above-described formula (4) can be modified as the following equation (A);

$$\rho(P)=\Delta r/R \quad \text{- - - (A)} \qquad \text{[Formula 4]}$$

That is to say, as apparent from the foregoing description, the user voice strength ratio when the phase difference of the user voices is neglected may be expressed as the above-described equation (A).

On the other hand, if the phase difference of the user voices is considered, then sound pressure "Q(S1)" and "QS2" of the user voices can be expressed by the following equations (5) and (6):

$$Q(S1)=K \times 1/R \times \sin \omega t \quad \text{- - - (5)}$$

$$Q(S2)=K \times 1/(R+\Delta r) \times \sin(\omega t - \alpha) \quad \text{- - - (6)} \qquad \text{[Formula 5]}$$

It should be noted that symbol "α indicates a phase difference in the equation (6).

At this time, the user voice strength ratio "ρ(S)" is expressed by the following equation (7):

$$\rho(S)= \text{- - - (7)} \qquad \text{[Formula 6]}$$

When the equation (7) is considered, a magnitude of the user voice strength ratio "ρ(S)" can be expressed by the following equation (8):

$$\rho(S)= \text{- - - (8)}$$

On the other hand, in the above-described equation (8), the term "sin ωt−sin(ωt−α)" indicates a strength ratio of phase components, and the term "Δr/R×sin ωt" represents a strength ratio of amplitude components. Even when the phase difference components are produced from the user voice components, the phase difference components constitute noises with respect to the amplitude components. As a result, in order to extract the user voices in higher precision, it is required that the strength ratio of the phase components becomes sufficiently smaller than the strength ratio of the amplitude components. That is to say, it is important that both the term "sin ωt−sin(ωt−a)", and the term "Δr/R×sin ωt" must satisfy the below-mentioned relationship, or inequality (B):

$$\text{- - - (B)} \qquad \text{[Formula 8]}$$

In this case, the term "sin ωt−sin(ωt−α)" can be expressed by the following equation (9):

$$\sin \omega t - \sin(\omega t - \alpha) = \text{- - - (9)} \qquad \text{[Formula 9]}$$

As a result, the above-described inequality (B) can be expressed by the below-mentioned inequality (10):

$$\text{- - - (10)} \qquad \text{[Formula 10]}$$

When an amplitude component of the inequality (10) is considered, the following fact can be revealed. That is, the microphone unit 1 according to the present embodiment mode must satisfy the below-mentioned inequality (C):

$$\Delta r/R > 2 \sin(\alpha/2) \quad \text{- - - (C)} \qquad \text{[Formula 11]}$$

It should also be noted that, as previously described it can be regarded that "Δr" is sufficiently smaller than the distance "R." As a result, it can be regarded that "sin(α/2)" is sufficiently small, and can be approximated to the below-mentioned formula (11):

$$\text{"sin(α/2)" is nearly equal to "(α/2)"} \quad \text{- - - (11)} \qquad \text{[Formula 12]}$$

As a consequence, the inequality (C) can be modified as follows:

$$\Delta r/R > \alpha \quad \text{- - - (D)} \qquad \text{[Formula 13]}$$

Also, if a relationship between "α" and "Δr" corresponding to the phase difference is expressed by the following equation (12), $$\alpha = (2\pi\Delta r)/\lambda \quad \text{- - - (12)} \qquad \text{[Formula 14]}$$

then the above-explained inequality (D) can be modified as the following inequality (E):

$$\Delta r/R > 2\pi(\Delta r/\lambda) > \Delta r\lambda \quad \text{- - - (E)} \quad \text{[Formula 15]}$$

In other words, in the present embodiment mode, if the microphone unit 1 can satisfy the relationship indicated in the inequality (E), then the microphone unit 1 can extract the user voices in the higher precision.

Next, sound pressure of noises will now be considered which are entered to the first plane 35 and the second plane 37 (namely, first and second opening portions 12 and 14).

Assuming now that an amplitude of a noise component entered to the first plane 35 is "A" and an amplitude of a noise component entered to the second plane 37 is "A'", sound pressure "Q(N1)" and "QN2" of noises produced by considering a phase difference component can be expressed by the following equations (13) and (14):

$$Q(N1) = A \sin \omega t \quad \text{- - - (13)}$$

$$Q(N2) = A' \sin(\omega t - \alpha) \quad \text{- - - (14)} \quad \text{[Formula 16]}$$

A noise strength ratios "ρ(N)" indicative of a ratio of a strength of a noise component contained in differential pressure with respect to a strength of sound pressure of a noise component entered to the first plane 35 (first opening portion 12) can be expressed by the below-mentioned equation (15):

$$\rho(N) = \quad \text{- - -(15)} \quad \text{[Formula 17]}$$

It should also be noted that as previously explained, the amplitudes (strengths) of the noise components are substantially equal to each other, which are entered to the first and second planes 35 and 37 (first and second opening portion 12 and 14), and therefore, these amplitudes can be handled as A=A'. As a consequence, the above-described equation (15) can be modified as the following equation (16):

$$\rho(N) = \quad \text{- - - (16)} \quad \text{[Formula 18]}$$

Then, a magnitude of the noise strength ratio "ρ(N)" can be expressed by the following equation (17):

$$\rho(N) = \quad \text{- - - (17)} \quad \text{[Formula 19]}$$

In this case, if the above-descried formula (9) is considered, the above-explained equation (17) can be modified as the following equation (18):

$$\rho(N) = \quad \text{- - - (18)} \quad \text{[Formula 20]}$$

Then, it the formula (11) is considered, then the above-described equation (18) can be modified as the below-mentioned equation (19):

$$\rho(N) = \alpha \quad \text{- - - (19)} \quad \text{[Formula 21]}$$

In this case, while referring to the above-described formula (D), a magnitude of the noise strength ratio can be expressed as the following formula (F):

$$\rho(N) = \alpha < (\Delta r/R) \quad \text{- - - (F)} \quad \text{[Formula 22]}$$

It should also be noted that as represented in the above-described formula (A), symbol "Δr/R" implies the strength ratio of the amplitude components of the user voices. As can be understood from the formula (F), in the microphone unit 1 of the present embodiment mode, the noise strength ratio becomes smaller than the strength ratio "Δr/R" of the user voices.

As apparent from the above-described explanations, in accordance with the microphone unit 1 (refer to formula (B)) in which the strength ratio of the phase components of the user voices becomes smaller than the strength ratio of the amplitude components, the noise strength ratio can become smaller than the voice strength ratio. Conversely speaking, in accordance with the microphone unit 1 designed in such a manner that the noise strength ratio becomes smaller than the strength ratio of the user voices, the high-precision noise eliminating function can be realized.

A description is made of a method for manufacturing the microphone unit 1 according to the present embodiment mode. It should also be understood that although the microphone unit 1 will be described as an exemplification of the manufacturing method, this manufacturing method may be similarly applied to the microphone units 1', 2, and 2'.

In the present embodiment mode, the microphone unit 1 may be manufactured by utilizing data indicative of a corresponding relationship between a value of "Δr/λ" for showing a ratio of the center-to-center distance "Δr" of the first and second opening portions 12 and 14 with respect to a wavelength "λ" of a noise, and a noise strength ratio (strength ratio defined based upon phase components of noises).

The strength ratio defined based upon the phase components of the noises is expressed by the above-explained formula (18). As a consequence, a decibel value of the strength ratio based upon the phase components of the noises can be expressed as the following formula (20):

$$20 \log \pi(N) = \quad \text{- - - (20)} \quad \text{[Formula 23]}$$

Figure 16:
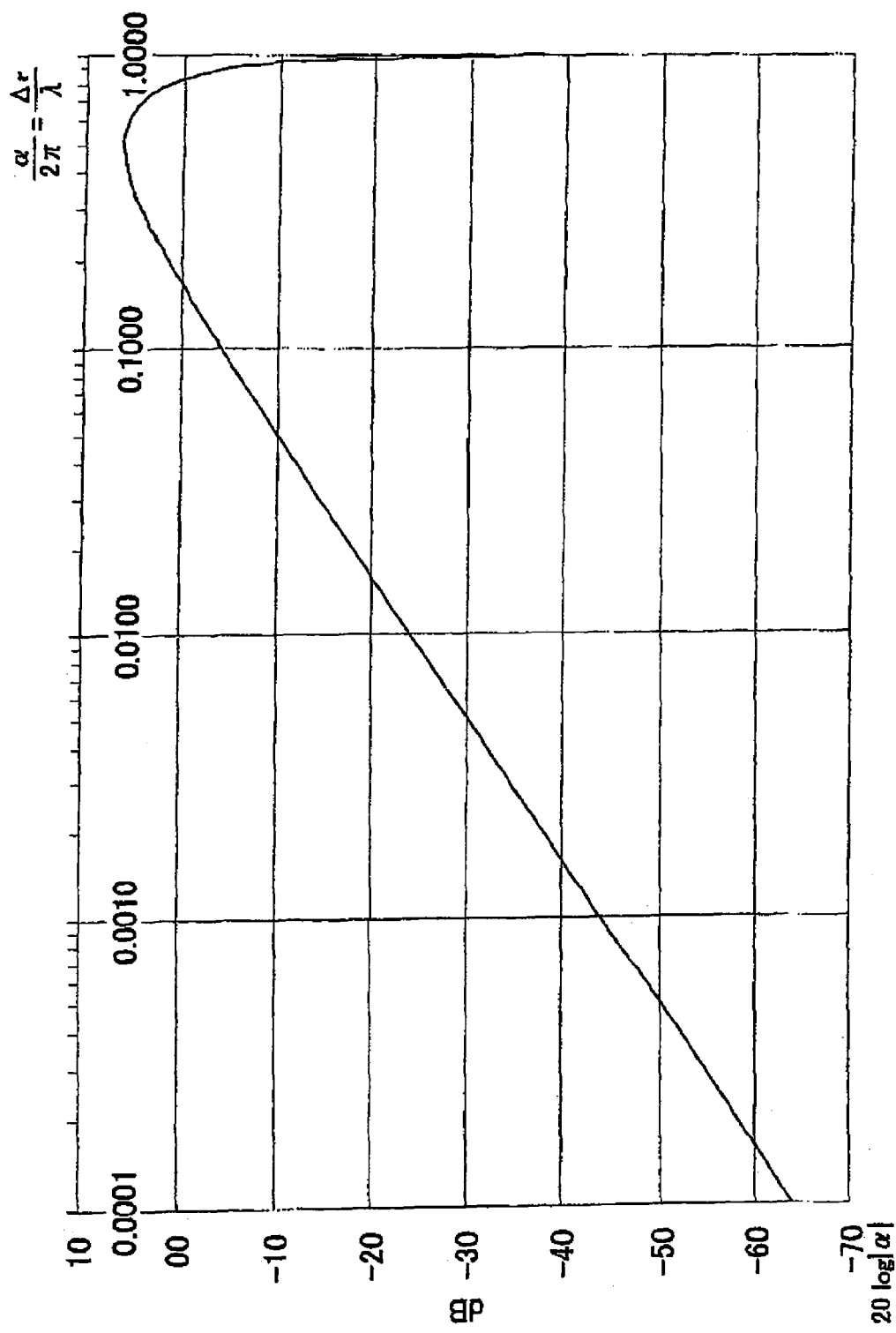
FIG. 16 is a graphic diagram for representing one example of data indicative of a corresponding relationship between a phase difference and a strength ratio.

Then, if respective values are substituted for "α" of the above-described formula (20), then the corresponding relationship between the phase difference "α" and the strength ratio defined based upon the phase components of the noises can be revealed. FIG. 16 represents one example of data indicative of a corresponding relationship between phase differences and strength ratios in such a case that an abscissa is defined as "α/2π" and an ordinate is defined as a strength ratio (decibel value) based upon the phase components of the noises.

As indicated in the above-described formula (12), the phase difference "α" can be expressed by a function of "Δr/λ" (equal to ratio of distance "Δr" to wavelength "λ"), and thus, the abscissa of FIG. 16 can be regarded as "Δr/λ" In other words, FIG. 16 is such a data indicative of a corresponding relationship between "Δr/λ" and the strength ratio based upon the phase components of the noises.

Figure 17:
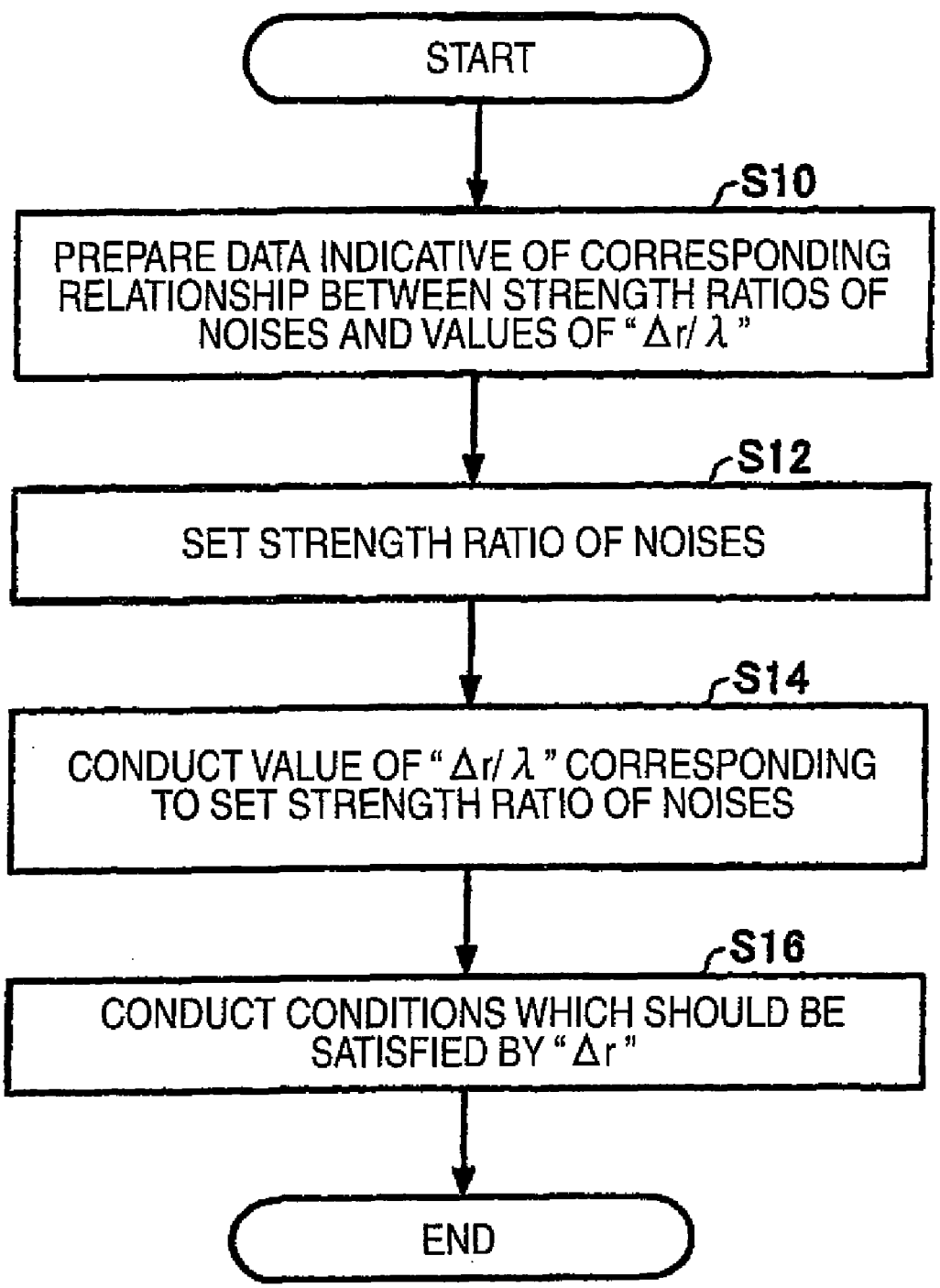
FIG. 17 is a flow chart for describing sequential operations for manufacturing a microphone unit according to another embodiment mode of the present invention.

In this embodiment mode, the microphone unit 1 is manufactured by utilizing the above-described data. FIG. 17 is a flow chart for describing sequential operations for manufacturing the microphone unit 1 by utilizing this data.

First of all, the data (refer to FIG. 6) representative of the corresponding relationship between "Δr/λ" and the strength ratio of the noises (strength ratio based upon phase components of noises) is prepared (step S10).

Next, a strength ratio of noises is set in correspondence with various uses (step S12). It should be noted that the strength ratio of noises must be set in such a manner that the strengths of the noises are lowered in the present embodiment mode. To this end, in this step S12, the strength ratio of the noises is set to be lower than or equal to 0 dB.

Next, a value of "Δr/λ" corresponding to the strength ratio of the noises is conducted based upon the above-described data (step S14).

Then, a wavelength of a major noise is substituted for "λ" in order to conduct such a condition which should be satisfied by "Δr" (step S16).

As a concrete example, the below-mentioned manufacturing method of the microphone unit 1 will now be considered, while the strength of the noise may be lowered by 20 dB under such an environment that the major noise is 1 KHz wand the wavelength thereof is 0.347 m.

Firstly, a consideration is made of such a condition in order that the strength ratio of the noises becomes lower than, or equal to 0 dB. Referring now to FIG. 16, in order that the strength ratio of the noises is set to be lower than, or equal to 0 dB it can be revealed that the value of "$\Delta r/\lambda$" is smaller than, or equal to 0.16. In other words, it can be revealed that the value of "$\lambda$" is decreased to be smaller than, or equal to 55.46 mm, which may constitute a necessary condition of the microphone unit 1 (housing 10).

Next, a consideration is made of such a condition that the strength of the noise of 1 KHz is lowered by 20 CB. Referring to FIG. 16, in order to lower the strength of the noise by 20 dB, it can be revealed that the value of "$\Delta r/\lambda$" is selected to be 0.015. Then, assuming now that $\lambda=0.347$ m, it can be revealed that this condition can be satisfied when the value of "$\Delta r$" is smaller than, equal to 5.199 mm. In other words, it the value of "$\Delta r$" is set to be smaller than, or equal to approximately 5.2 mm, then such a microphone unit having a noise eliminating function can be manufactured.

It should also be noted that when the microphone unit 1 according to the present embodiment mode is utilized in a close-talking type voice input apparatus, an interval between a sound source of a user voice and the microphone unit 1 (first and second opening portions 12 and 14) is smaller than, or equal to 5 cm under normal condition. Also, an interval between a sound source of a user voice and the microphone unit 1 (first and second opening portions 12 and 14) can be set by designing a housing into which the microphone unit 1 is stored. As a consequence, the value of "$\Delta r/R$" (corresponding to strength ratio of user voices) becomes 0.1 (namely, strength ratio of noises), and therefore, it can revealed that the noise eliminating function may be realized.

It should also be understood that noises are not normally restricted to a single frequency. However, such a wavelength of such a noise having a frequency lower than the frequency of the noise which is supposed as the major noise becomes longer than the wavelength of the major noise, a value of "$\Delta r/\lambda$" becomes small, so that this noise is eliminated by the microphone unit 1. Also, the higher the frequencies of sound waves are increased, the faster the energy of the sound waves is attenuated. As a consequence, such a noise having a higher frequency than that of the noise supposed as the major nose is attenuated faster than this major noise, so that an adverse influence of this noise given to the microphone unit 1 (vibration film 30) can be neglected. As can be understood from the above-described fact, even under such an environment that there are such noises having the frequencies different from the frequency or the noise supposed as the major noise, since the microphone unit 1 according to the present embodiment mode is caused to function as the differential microphone, the microphone unit 1 can achieve the superior noise eliminating function.

Also, as can be understood from the formula (12), in the present embodiment mode, such a noise has been supposed which is entered onto the straight line for connecting the first and second opening portions 12 and 14 to each other. This supposed noise corresponds to such a noise that a virtual interval between the first and second opening portions 12 and 14 becomes the largest interval, and a phase difference becomes the largest value under the actual use environment. In other words, since the microphone unit 1 according to the present embodiment mode is caused to function as the differential microphone, the microphone unit 1 has been arranged in such a manner that the noise whose phase difference becomes the largemost value can be eliminated. As a consequence, since the microphone unit 1 of the present embodiment mode is caused to function as the differential microphone, this microphone unit 1 can eliminate the noises which are entered from all of directions.

Effects which can be achieved by the microphone units according to the present embodiment modes will now be summarized as follows:

In accordance with the microphone unit 1, under such a status that both the first and second opening portions 12 and 14 have been opened, the user voices and the noises are entered to both the first and second planes (35, 37) of the vibration film 30. Since the sound pressure of the noises entered to both the planes (35, 37) of the vibration film 30 from the remote place become substantially equal to each other, these noises are cancelled with each other by the vibration film 30. As a consequence, the sound pressure for vibrating the vibration film 30 can be regarded as the sound pressure indicative of the user voices, and furthermore, the electric signal 38 acquired based upon the vibrations of the vibration film 30 can be regarded as the electric signal representative of the user voices, from which the noises have been eliminated.

Also, in accordance with the microphone unit 1, in such a case that the voices are entered to both the planes (35, 37) of the vibration film 30, the electric signal 38 having such a voltage level responding to the difference "pf–pb" between the sound pressure applied to both the planes (35, 37) of the vibration film 30 is acquired. Then, sound pressure is in inverse proportion to a distance measured from a sound source, so that the larger the difference between the distances measured from the sound source to the first and second opening portions 12 and 14 is increased, the higher the voltage level of the acquired electric signal 38 is increased. In other words, under such a status that both the first and second opening portions 12 and 14 have been opened, the microphone unit 1 can be caused to function as a microphone having dual directional characteristics, namely, sensitivity of this microphone has the highest sensitive value in such a case that the sound source is located on the straight line which connects the first and second opening portions 12 and 14 to each other.

Also, in accordance with the microphone unit 1, under such a status that any one of the first and second opening portions 12 and 14 has been closed, for instance, under such a status that the second opening portion 14 has been closed, both the user voices and the noises are entered to one plane 35 of the vibration film 30. When the user voices are entered to both the planes (35, 37) of the vibration film 30, the sound pressure for vibrating the vibration film 30 corresponds to the difference "pf–pb" between the sound pressure applied to both the planes (35, 37) of the vibration film 30, whereas when the user voice is entered to the single plane 35 of the vibration film 30, the sound pressure for vibrating the vibration film 30 corresponds to the sound pressure "pf" which is applied to the single plane 35 of the vibration film 30. As a consequence, under such a status that one of the first and second opening portions 12 and 14 has been closed, the voltage level of the electric signal 38 indicative of the user voice can be increased. As a result, under such an environment that there is substantially no noise, the SNR obtained under such a status that one of the first and second opening portions 12 and 14 has been closed can be improved, as compared with the SNR obtained under such a status that both the first and second opening portions 12 and 14 have been opened.

Also, in accordance with the microphone unit 1, under such a status that anyone of the first and second opening portions 12 and 14 has been closed, since both the user voices and the noises are entered to one plane 35 of the vibration film 30, this microphone unit 1 can be caused to function as the microphone having the omnidirectional characteristic. As a consequence, the microphone unit 1 may also be utilized as such a use field that surrounding sounds are intentionally collected.

Moreover, in accordance with the microphone unit 1, the voltage level of the electric signal 38 indicative of the user voices under such a status that the first and second opening portions 12 and 14 have been opened is lower than the voltage level of the electric signal 38 indicative of the user voices under such a status that any one of the first and second opening portions 12 and 14 has been closed. As a consequence, when both the first and second opening portions 12 and 14 have been opened, such a higher gain is applied to the electric signal 38 indicative of the user voices, as compared with the gain applied to the electric signal 38 when any one of the first and second opening portions 12 and 14 has been closed. As a result, if the gain is properly set, then the sound volumes of the user voices outputted from the microphone unit 1 can be kept constant even under such a status that both the first and second opening portions 12 and 14 have been opened, and also, any one of the first and second opening portions 12 and 14 has been closed. As a consequence, the microphone unit 1 can avoid that since the sound volumes are rapidly changed, the user can hardly hear the conversation made by the counter person.

It should also be understood that in accordance with the microphone unit 1, since both the first and second opening portion 12 and 14 are brought into the open status, the microphone unit 1 can also eliminate user voice components entered to the vibration film 30 (first and second planes 35 and 37) after the user voices have been reflected on a wall, and the like. Precisely speaking, after the user voices reflected on the wall and the like are propagated over a long distance, the propagated user voices are entered to the microphone unit 1. As a result, the entered user voices may be regarded as such a voice generated from a sound source located far from the sound source of the normal user voices, and furthermore, a large amount of energy has been lost during reflections, so that similar to the noise component, sound pressure thereof between the first and second opening portions 12 and 14 is not largely attenuated. As a consequence, in accordance with the above-described microphone unit 1, the user voice components which are entered to this microphone unit 1 after these user voice components have been reflected on the wall and the like may also be eliminated in the similar manner to that of the noises (namely, one sort of noises).

As previously explained, the present invention can provide such a microphone unit 1 having the high quality and capable of changing the microphone characteristics, if required, while the microphone unit 1 is equipped with the simple structure.

Then, if the microphone unit 1 is utilized, then the signal indicative of the user voices which do not contain the noises can be acquired by bringing the first and second opening portions 12 and 14 into the open status. As a result, if the microphone unit 1 is utilized, then speech recognizing processings, speech authenticating processings, and command generating processings can be realized in high precision.

In accordance with the microphone unit 1', since the open/close mechanism 60 is contained, the below-mentioned effects can be achieved in addition to the above-explained effects achieved by the microphone unit 1.

That is, in accordance with microphone unit 1', since the open/close mechanism 60 is provided, the user is no longer require to continuously depress the second opening portion 14 by her finger of this user in order to cause the microphone unit 1T to function as the differential microphone, and the second opening portion 14 can be continuously kept under either the open status or the close status.

Also, in accordance with the microphone unit 1', since the microphone unit 1' contains the open/close control unit 70 for controlling the open/close statuses of the open/close mechanism 60 based upon the sound volume of the talking person, the user no longer pays her attention to the open, or close status of the open/close mechanism 60, so that practical utility thereof can be furthermore improved.

In accordance with the microphone unit 2, since the switch 54 is contained, the below-mentioned effects can be achieved in addition to the above-explained effects achieved by the microphone unit 1.

That is, in accordance with microphone unit 2, since the switch 54 is provided adjacent to the second opening portion 14, the second opening portion 14 can be closed by her finger of the user, and at the same time, the switch 54 can be depressed by her finger. As a consequence, the gain of the output unit 40 can be controlled in response to the open/close statuses of the second opening portion 14 with employment of the simple structure.

In accordance with the microphone unit 2', since the open/close mechanism 60 and the switch 54 are provided, similar effects to those achieved by the above-described microphone units 1, 1', and 2 can be obtained.

Next, a description is made of a voice input apparatus 200 according to another embodiment mode of the present invention, which is equipped with the microphone unit 1 of the above-described embodiment mode. It should be understood that although the voice input apparatus 200 having the microphone unit 1 will be exemplified in the following description, the above-described technical idea may be similarly applied to such voice input apparatuses equipped with the microphone units 1', 2, and 2'.

Figure 19:
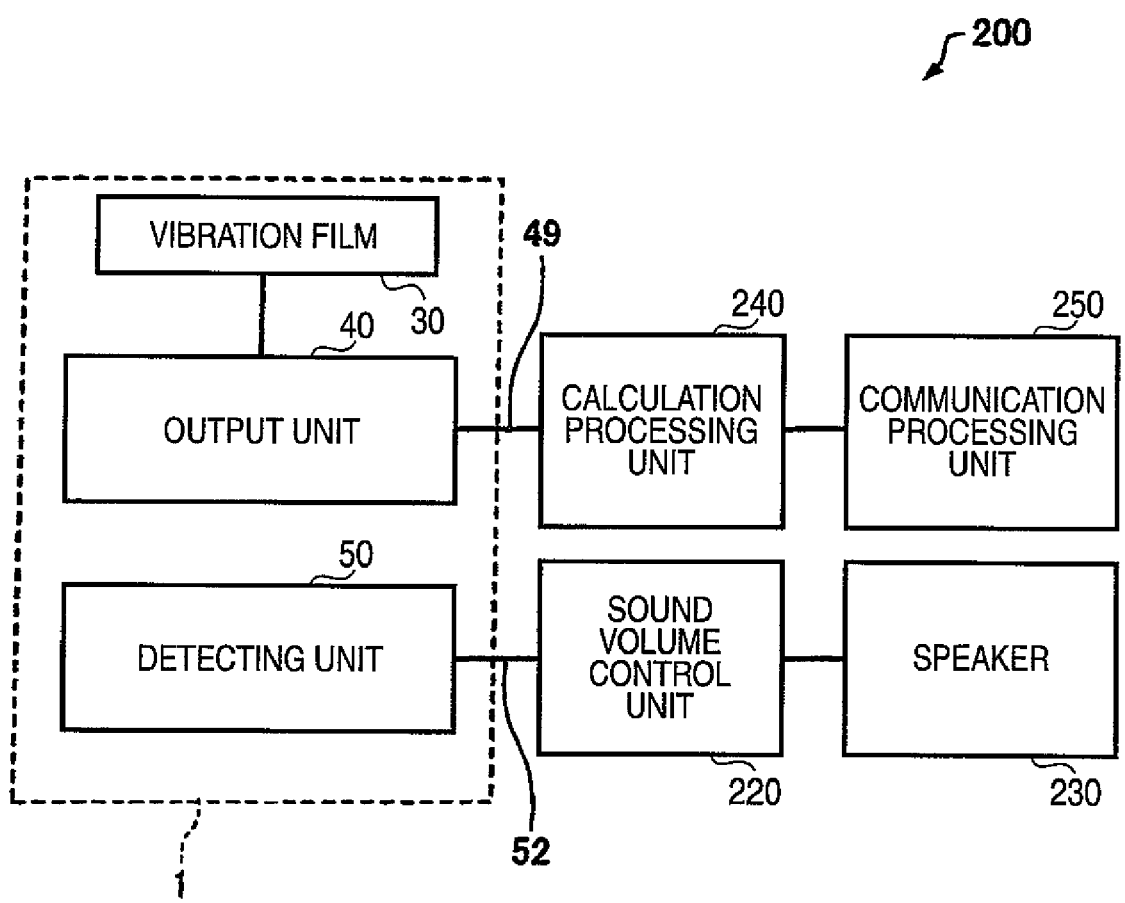
FIG. 19 is an explanatory diagram for explaining a voice input apparatus according to another embodiment mode of the present invention.

Firstly, a structure of the voice input apparatus 200 will be explained. FIG. 16 and FIG. 19 are diagrams for explaining the structure of the voice input apparatus 200. It should also be noted that the below-mentioned voice input apparatus 200 corresponds to a close-talking type voice input apparatus, and may be applied to, for example, voice communication appliances such as a portable telephone and a transceiver, information processing systems (namely, speech authenticating system, speech recognizing system, command producing system, electronic dictionary, translating machine, voice input type remote controller etc.) which utilize techniques capable of analyzing input voices, otherwise, recording appliances, amplifier systems (laud speaker), microphone systems, or the like.

Figure 18:
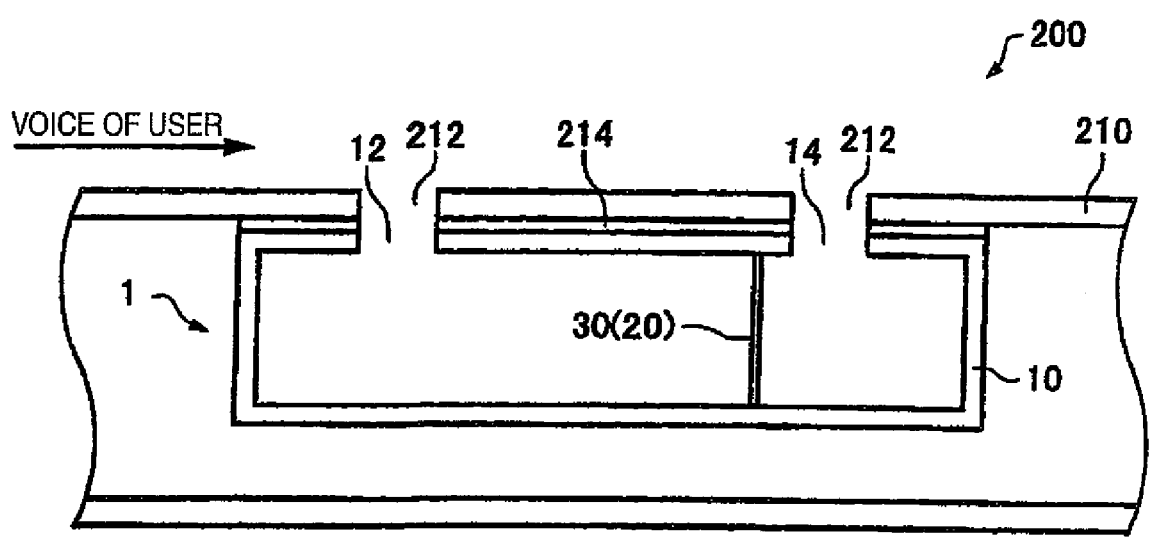
FIG. 18 is an explanatory diagram for explaining a voice input apparatus according to another embodiment mode of the present invention.

FIG. 18 is an explanatory diagram for explaining the structure of the voice input apparatus 200.

The voice input apparatus 200 has a housing 210. The housing 210 corresponds to a member for constructing an outer shape of the voice input apparatus 200. A basic attitude may be alternatively set to the housing 210, so that a traveling path of user voices may be defined. Alternatively, an opening 212 used to accept voices of users may be formed in the housing 210.

In the voice input apparatus 200, the microphone unit 1 is installed inside the housing 210. Alternatively, the microphone unit 1 may be alternatively installed in the housing 210 in such a manner that the first and second opening portions 12 and 14 are communicated with the opening 212. Also, the microphone unit 1 may be alternatively installed via an elastic member 214 in the housing 210. As a result, since vibrations of the housing 210 can be hardly transferred to the microphone unit 1 (housing 10), the microphone unit 1 may be operated in higher precision.

Alternatively, the microphone unit 1 may be installed in the housing 210 in such a manner that the first and second opening portions 12 and 14 are arranged to be shifted from each other along the traveling direction of the user voice. Then, such an opening which is arranged on the up stream side of the traveling path of the user voice may be defined as the first opening 12, whereas another opening which is arranged on the down stream side of the traveling path of the user voice may be defined as the second opening 14.

When the microphone unit 1 is arranged in the above-described manner in which the vibration film 30 has been arranged on the side of the second opening portion 14, under such a status that both the first and second opening portions 12 and 14 are not closed (under such a status that microphone unit 1 functions as differential microphone), the user voices can be simultaneously entered to both the planes (first and second planes 35 and 37) of the vibration film 30.

Precisely speaking, in the microphone unit 1, a distance from the center of the first opening portion 12 to the first plane 35 becomes substantially equal to a distance from the first opening portion 12 to the second opening portion 14. As a result, a time required during which the user voice passed through the first opening portion 12 is entered to the first plane 35 becomes substantially equal to such a time required during which the user voice passed over the first opening portion 12 is entered via the second opening portion 14 to the second plane 37.

In other words, the time required during which the voice produced by the user is entered to the first plane 35 becomes equal to the time required during which the voice produced by the user is entered to the second plane 37. As a consequence, the voices produced by the user can be entered to the first plane 35 and the second plane 37 at the same time, and therefore, the vibration film 30 can be vibrated in such a manner that noises caused by phase shifts are not generated. In other words, in the previously explained formula (8), since "$\alpha=0$" and "$\sin \omega t - \sin(\omega t - \alpha) = 0$", it can be understood that the term "$\Delta r/R \cdot \sin \omega t$)" (only amplitude component) is extracted. As a result, even in such a case that a user voice having a frequency of approximately 7 KHz is inputted which corresponds to a high frequency range as a human voice, an adverse influence caused by phase distortions occurred between sound pressure entered to the first plane 35 and sound pressure entered to the second plane 37 can be neglected. As a result, such an electric signal which correctly indicates the user voices can be acquired.

Next, functions of the voice input apparatus 200 will now be described with reference to FIG. 19. FIG. 19 is a block diagram for explaining the functions of the voice input apparatus 200.

The voice input apparatus 200 is equipped with the microphone unit 1. The microphone unit 1 outputs the electric signal 49 produced in response to the vibrations of the vibration film 30. It should be understood that when the microphone unit 1 is used as a differential microphone, the electric signal 49 outputted from the microphone unit 1 corresponds to the electric signal indicative of the user voices from which the noise components have been eliminated.

Alternatively, the voice input apparatus 200 may be equipped with a speaker 230 and a sound volume control unit 220 for controlling a sound volume of the speaker 220. The sound volume control unit 220 controls the sound volume of the speaker 230 in such a manner that the sound volume obtained under such a status that the first opening portion 12 and the second opening portion 14 of the microphone unit 1 have been opened (status under which microphone unit 1 functions as differential microphone) becomes larger than the sound volume obtained under such a status that either the first opening portion 12 or the second opening portion 14 of the microphone unit 1 has been closed (status under which microphone unit 1 functions as normal microphone). In other words, in accordance with the voice input apparatus 200, in such a case that the user is operating the voice input apparatus 200 under such a status that both the first and second opening portions 12 and 14 of the microphone unit 1 have been opened, it is predictable that the user is present under noisy environment. As a result, the sound volume of the speaker 230 is increased, so that the user can easily hear the sounds produced from the speaker 230.

Also, the sound volume control unit 220 may alternatively control the sound volume of the speaker 230 to be increased when the present status is changed from such a status that either the first opening portion 12 or the second opening portion 14 of the microphone unit 1 has been closed (status under which microphone unit 1 functions as normal microphone) to another status that the first opening portion 12 and the second opening portion 14 of the microphone unit 1 have been opened (status under which microphone unit 1 functions as differential microphone). In other words, in accordance with the voice input apparatus 200, when the present status is changed from the status under which either the first opening portion 12 or the second opening portion 14 of the microphone 1 has been closed to the status under which both the first opening portion 12 and the second opening portion 14 have been opened, it is predictable that the present environment has been changed from the environment under which there is a small amount of noises to another environment under which there are large amounts of noise. As a result, the sound volume of the speaker 230 is increased, so that the user can easily hear the sounds produced from the speaker 230.

Moreover, the sound volume control unit 220 may alternatively control the sound volume of the speaker 230 to be decreased when the present status is changed from such a status that the first opening portion 12 and the second opening portion 14 of the microphone unit 1 have been opened (status under which microphone unit 1 functions as differential microphone) to another status that the first opening portion 12, or the second opening portion 14 of the microphone unit 1 has been closed (status under which microphone unit 1 functions as normal microphone). In other words, in accordance with the voice input apparatus 200, when the present status is changed form the status under which both the first opening portion 12 and the second opening portion 14 of the microphone 1 have been opened to the status under which either the first opening portion 12 or the second opening portion 14 has been closed, it is predictable that the present environment has been changed from the environment under which there are large amounts of noises to another environment under which there is a small amount of noises. As a result, the sound volume of the speaker 230 is decreased, so that the user can easily hear the sounds produced from the speaker 230.

Alternatively, the sound control unit 220 may control the sound volume of the speaker 230 by judging whether the present status corresponds to the status under which both the first opening portion 12 and the second opening portion 14 have been opened, or the status under which either the first opening portion 12 or the second opening portion 14 has been closed based upon the detection signal 52 outputted from the microphone unit 1 (detecting unit 50).

Alternatively, the sound control unit 220 may control the sound volume of the speaker 230 by judging whether the present status corresponds to the status under which both the first opening portion 12 and the second opening portion 14 have been opened, or the status under which either the first opening portion 12 or the second opening portion 14 has been closed based upon the electric signal 49 (this signal 49 can be regarded as volume of talking person) outputted from the microphone unit 1 (output unit 40).

Also, the voice input apparatus 200 may be equipped with a calculation processing unit 240. The calculation processing unit 240 performs various sorts of calculating process operations based upon the electric signal 49 outputted from the microphone unit 1 (output unit 40). Alternatively, the calculation processing unit 240 may execute an analyzing process operation with respect to the electric signal 49. Since the calculation processing unit 240 may analyze the output signal 49 derived from the microphone unit 1, this calculation processing unit 240 may alternatively perform such a process operation capable of specifying a person who produces the user voices (namely, so-called "speech authenticating process"). Otherwise, since the calculation processing unit 240 may analyze the output signal 49 derived from the microphone unit 1, this calculation processing unit 240 may alternatively perform such a process operation capable of specifying a content of the user voices (namely, so-called "speech recognizing process"). Also, the calculation processing unit 240 may execute a process operation for producing various sorts of commands based upon the output signal 49 derived from the microphone unit 1. The calculation processing unit 240 may alternatively perform a process operation for amplifying the output signal 49 derived from the microphone unit 1. Further, the calculation processing unit 240 may alternatively control operations of a communication processing unit 250 (will be discussed later). It should also be understood that the calculation processing unit 240 may realize the above-explained various sorts of functions by executing signal processing operations by a CPU and a memory. Otherwise, the calculation processing unit 240 may realize the above-described various sorts of functions by operating exclusively-used hardware.

Alternatively, the voice input apparatus 200 may further contain a communication processing unit 250. The communication processing unit 250 controls communications established between the voice input apparatus 200 and other terminals (portable telephone terminal, host computer, etc.). The communication processing unit 250 may have a function for transmitting signals (namely, output signals derived from microphone unit 1) to other terminals via a network. Alternatively, the communication processing unit 250 may have a function for receiving signals from other terminals via the network. Then, for instance, the communication processing unit 250 may execute analyzing process operations with respect to, for example, output signals acquired via the communication processing unit 250 by a host computer in order to execute various sorts of information processing operations, for instance, a speech authenticating process, a speech recognizing process, a command producing process, and data storing process. In other words, the voice input apparatus 200 may construct an information processing system in conjunction with other terminals. In other words, it can be recognized that the voice input apparatus 200 corresponds to an information input terminal which constitutes the information processing system. It should also be understood that the voice input apparatus 200 may not be provided with the communication processing unit 250. In accordance with this information processing system, since the microphone unit 1 is caused to function as the differential microphone, such an electric signal indicative of the user voice can be acquired, from which the noises have been eliminated in higher precision. As a consequence, in accordance with this information processing system, it is possible to provide such an information processing system capable of realizing a voice analyzing process operation in higher precision.

It should also be understood that the above-described calculation processing unit 240, communication processing unit 250, and sound volume control unit 220 may be alternatively arranged within the housing 210 as a packaged semiconductor device (integrated circuit device). However, the present invention is not limited only to the above-described modifications. For instance, the calculation processing unit 240 may be alternatively arranged outside the housing 210. In such a case that the calculation processing unit 240 is arranged outside the housing 210, this calculation processing unit 240 may acquire a signal via the communication processing unit 250.

It should also be noted that the voice input apparatus 200 may be furthermore provided with a display apparatus such as a display panel, and a voice output apparatus. Alternatively, the voice input apparatus 200 may further contain an operation key for inputting operation information.

Alternatively, the voice input apparatus 200 may constitute the above-described arrangements. This voice input apparatus 200 utilizes the microphone unit 1. As a result, in the case that the voice input apparatus 200 uses the microphone unit 1 as the differential microphone, this voice input apparatus 200 may acquire such a signal indicative of inputted voices which do not contain noises, and may realize high-precision speech recognition speech high-precision speech authentication, and a command producing process operation.

Moreover, if the voice input apparatus 200 is applied to a microphone system, when the microphone unit 1 is used as a differential microphone, voices of a user outputted from a speaker are also eliminated as noises. As a consequence, it is possible to provide a microphone system where a hauling phenomenon can hardly occur.

Figure 20:
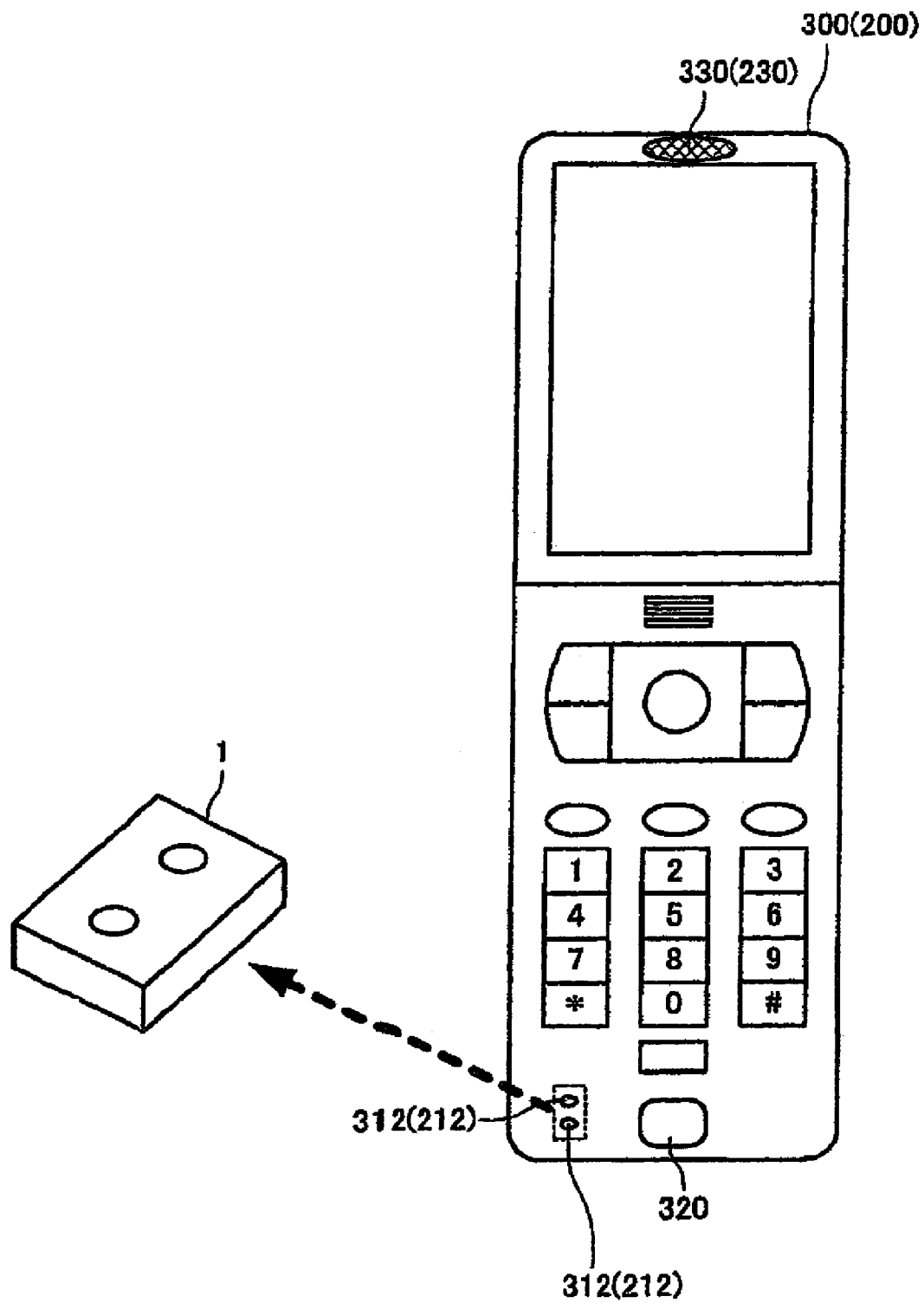
FIG. 20 is a diagram for indicating a portable telephone as one example of the voice input apparatus of the embodiment mode.
Figure 21:
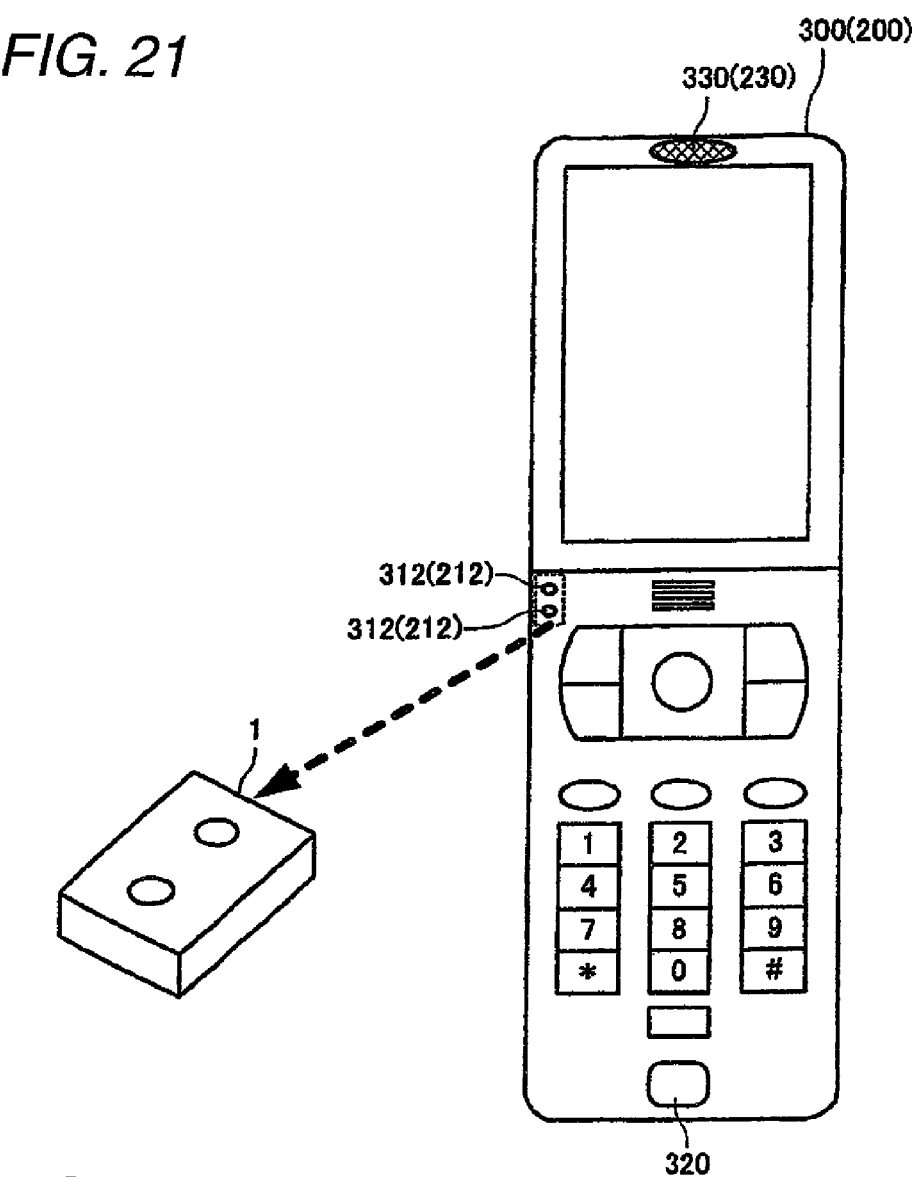
FIG. 21 is a diagram for showing a portable telephone as another example of the voice input apparatus.

FIG. 20 and FIG. 21 show a portable telephone 300 as one example of the above-described voice input apparatus 200. It should be understood that although two pieces of opening portions (microphone holes) 312 which are communicated to the first and second opening unit 12 and 14 of the microphone unit 1 are formed in a housing of the portable telephone 300, there is no specific restriction as to positions of the microphone holes 312. As represented in FIG. 20 and FIG. 21, two pieces of microphone holes 312 may be formed in one plane (front plane) of the portable telephone 300. Alternatively, these microphone holes 312 may be provided one by one in a front plane and a rear plane (located opposite to front plane) of the portable telephone 300.

Also, a noise cancel button 320 may be alternatively provided on the portable telephone 300. When a user depresses the noise cancel button 320, a lid portion 60 (not shown) of the microphone unit 1 may be opened and a noise cancel mode may be activated. In the noise cancel mode, the microphone unit 1 is brought into such a status that this microphone unit 1 functions as the differential microphone. Also, when the user depresses the noise cancel button 32 for a time longer than, or equal to a predetermined time (for instance, longer than, or equal to 1 second), the lid portion 60 (not shown) of the microphone unit 1 may be alternatively closed so as to release the noise cancel mode, so that a normal mode may be alternatively activated. In the normal mode, the microphone unit 1 is brought into such a status that the microphone unit 1 functions as the normal microphone. Furthermore, in the noise cancel mode, a sound volume of a speaker 330 may be alternatively increased, as compared with that of the normal mode.

Figure 22:
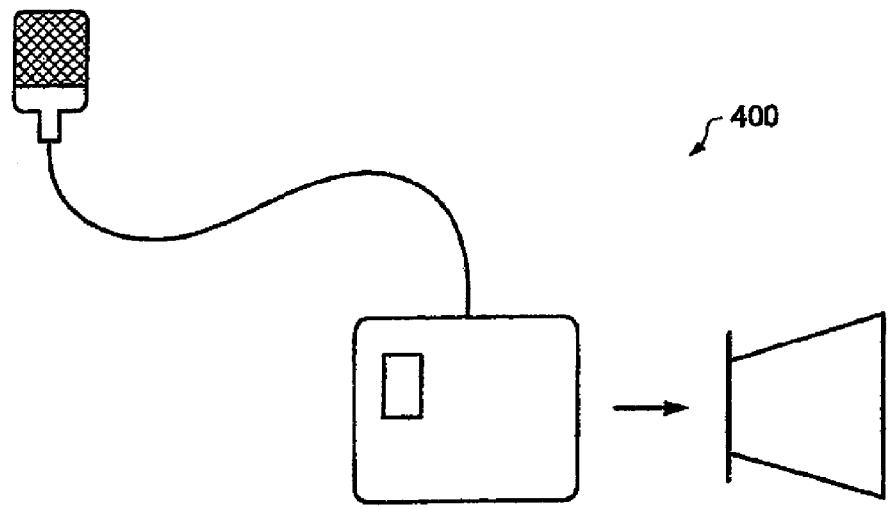
FIG. 22 is a diagram for showing a microphone as one example of the voice input apparatus.
Figure 23:
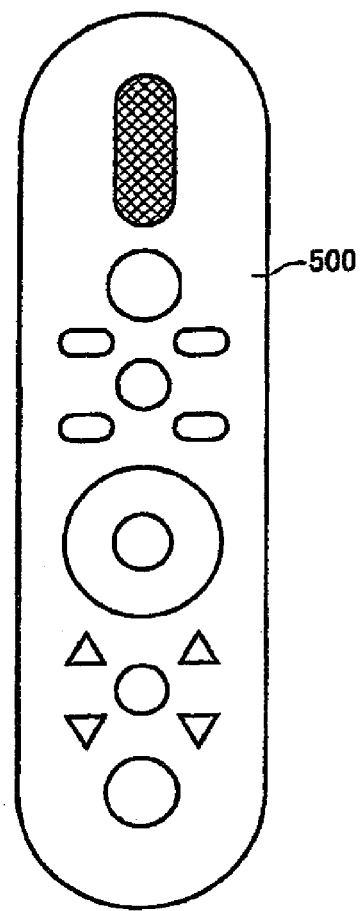
FIG. 23 is a diagram for indicating a remote controller as one example of the voice input apparatus.
Figure 24:
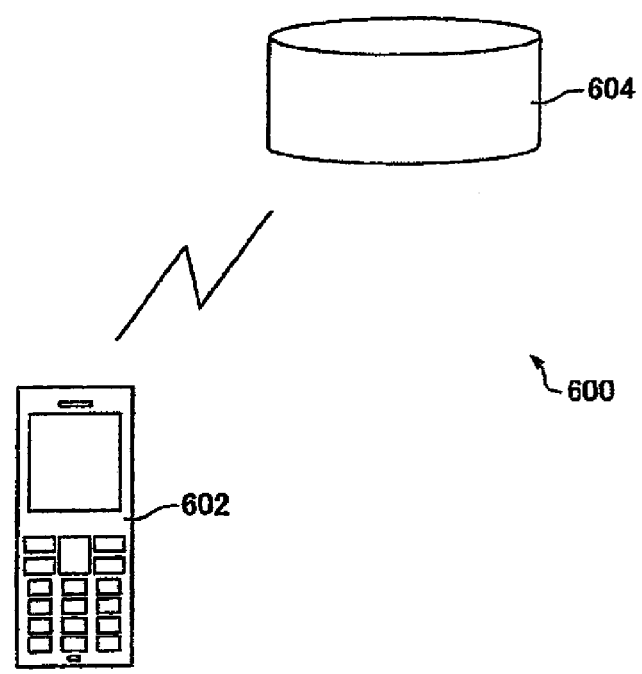
FIG. 24 is a schematic diagram for showing an information processing system employing the voice input apparatus of the embodiment mode.

FIG. 22 and FIG. 23 indicate a microphone (microphone system) 400 and a remote controller 500, respectively, as other examples of the voice input apparatus 200. FIG. 24 is a schematic diagram for showing an information processing apparatus 600 which contains a voice input apparatus 602 functioning as an information input terminal, and a host computer 604.

It should be understood that the present invention is not limited only to the above-described embodiment modes, but may be modified in various manners. The present invention may cover various structures which are essentially identical to the structures described in the embodiment modes (for instance, various structures whose functions, methods and results are identical to those of embodiment modes, or various structures whose purposes and effects are identical to those of embodiment modes). Also, the present invention may cover various structures capable of achieving either operation-effects or objects, which are identical to those explained in the above-described embodiment modes. Also, the present invention may cover various structures realized by adding the known technical ideas to the structures explained in the embodiment modes.

A description is made of concrete modifications related to arrangements of partition members (vibration films) of microphone units, and housings of these microphone units. It should be noted that in FIG. 25 to FIG. 32, although output units, switches (detecting units), open/close mechanisms (lid portions), open/close control units, and the like are not represented, these structural units may be employed inside housings, or may be additionally provided outside the housings.

Figure 25:
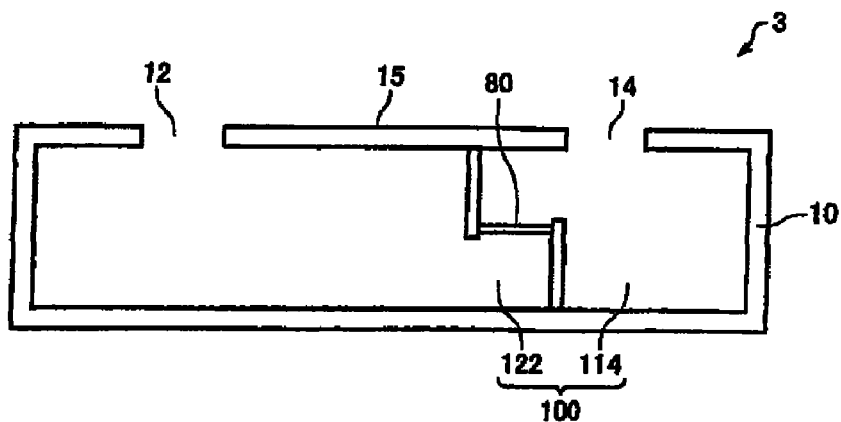
FIG. 25 is an explanatory diagram for explaining a microphone unit related to a first modification of the present invention.

FIG. 25 shows a microphone unit 3 according to a first modification of the embodiment mode to which the present invention has been applied.

The microphone unit 3 contains a vibration film 80. The vibration film 80 constitutes a portion of a partition member, while the partition member partitions an inner space 100 of a housing 10 into a first space 112 and a second space 114. The vibration film 80 has been provided in such a manner that a normal thereof is intersected perpendicular to a plane 15 (namely, vibration film 80 is provided parallel to plane 15). Alternatively, the vibration film 80 may be provided on the side of the second opening portion 14 in such a manner that the vibration film 80 is not overlapped with the first and second opening portions 12 and 14. As a result, even in such a case that a foreign article intrudes into the inner space 100 via the first and second opening portions 12 and 14, such a possibility that the vibration film 30 is directly damaged by this foreign article may be reduced. Also, the vibration film 80 may be alternatively arranged by maintaining an interval from the inner wall plane of the housing 10.

Figure 26:
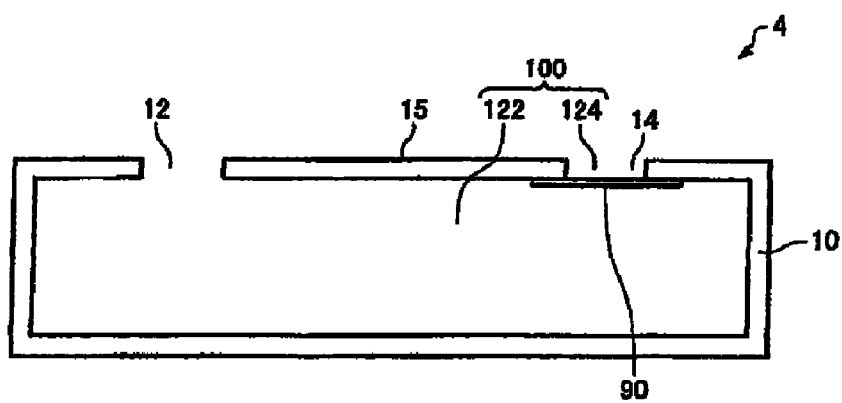
FIG. 26 is an explanatory diagram for explaining a microphone related to a second modification of the present invention.

FIG. 26 shows a microphone unit 4 according to a second modification of the embodiment mode to which the present invention has been applied.

The microphone unit 4 contains a vibration film 90. The vibration film 90 constitutes a portion of a partition member, while the partition member partitions an inner space 100 of a housing 10 into a first space 122 and a second space 124. The vibration film 90 has been provided in such a manner that a normal thereof is intersected perpendicular to a plane 15. Alternatively, the vibration film 90 may be provided in such a manner that the vibration film 90 is located coincident with an inner wall plane (namely, plane located opposite to plane 15) of the housing 10. Alternatively, the vibration film 90 may be provided in such a manner that the vibration film 90 closes the second opening portion 14 from the inner side (inner space 100) of the housing 10. In other words, in the microphone unit 3, only the inner space of the second opening portion 14 may be alternatively defined as the second space 124, whereas a space other than the second space 124 within the inner space 100 may be alternatively defined as the first space 122. As a result, it is possible to design the housing 10 having a thin wall.

Figure 27:
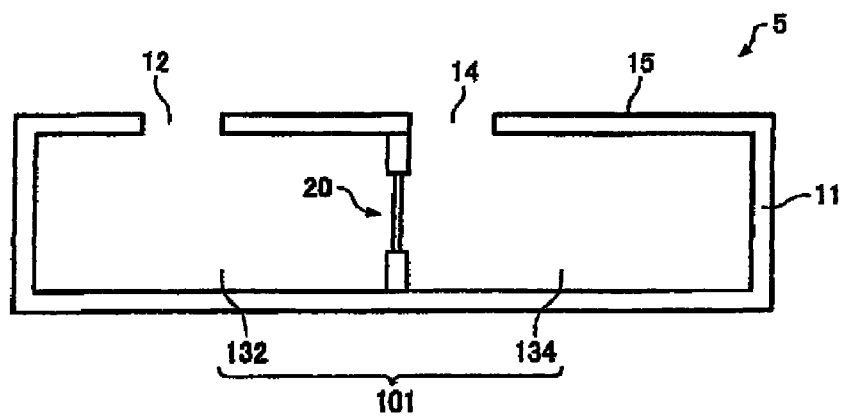
FIG. 27 is an explanatory diagram for explaining a microphone unit related to a third modification of the present invention.

FIG. 27 shows a microphone unit 5 according to a third modification of the embodiment mode to which the present invention has been applied.

The microphone unit 5 contains a housing 11. The housing 11 has an inner space 101. Then, the inner space 101 has been divided into a first region 132 and a second region 134 by a partition member 20. In the microphone unit 5, the partition member 20 is arranged on the side of the second opening portion 14. Also, in the microphone unit 5, the partition member 20 divides the inner space 101 in such a manner that a capacity of the first space 132 is made equal to a capacity of the second space 134.

Figure 28:
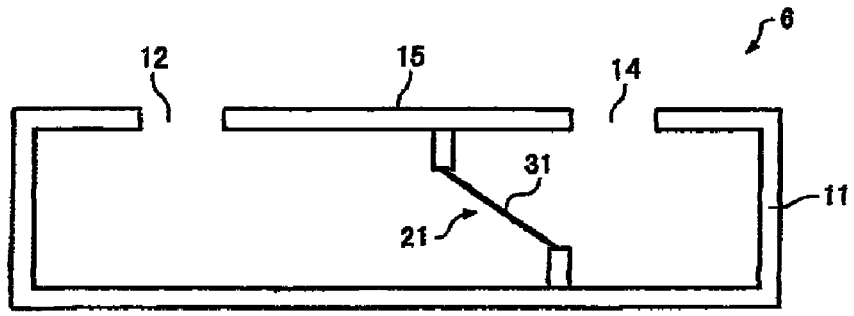
FIG. 28 is an explanatory diagram for explaining a microphone related to a fourth modification of the present invention.

FIG. 28 shows a microphone unit 6 according to a fourth modification of the embodiment mode to which the present invention has been applied.

As indicated in FIG. 28, the microphone unit 6 contains a partition member 21. Then, the partition member 21 contains a vibration film 31. The vibration film 31 has been held within the housing 10 in such a manner that a normal thereof is obliquely intersected with the plane 15.

Figure 29:
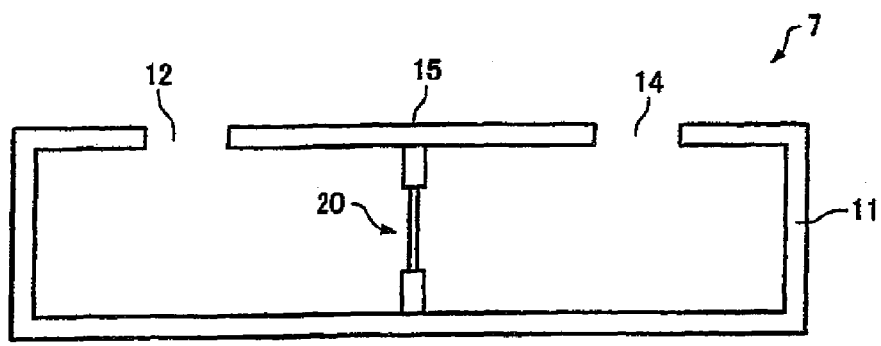
FIG. 29 is an explanatory diagram for explaining a microphone unit related to a fifth modification of the present invention.

FIG. 29 shows a microphone unit 7 according to a fifth modification of the embodiment mode to which the present invention has been applied.

As indicated in FIG. 29, in the microphone unit 7, the partition member 20 has been arranged at an intermediate position between the first and second opening portions 12 and 14. That is to say, a distance between the first opening portion 12 and the partition member 20 is made equal to a distance between the second opening member 14 and the partition member 20. Alternatively, in the microphone unit 7, the partition member 20 may be arranged in such a manner that this partition member 20 equally divides the inner space 100 of the housing 10.

Figure 30:
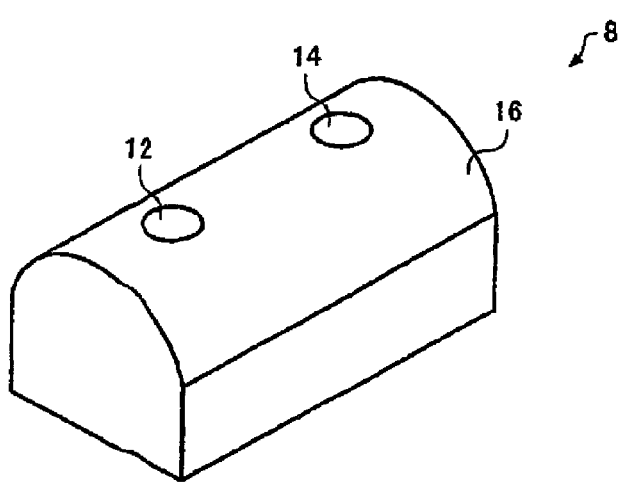
FIG. 30 is an explanatory diagram for explaining a microphone related to a sixth modification of the present invention.

FIG. 30 shows a microphone unit a according to a sixth modification of the embodiment mode to which the present invention is applied.

As represented in FIG. 30, in the microphone unit 8, a housing has been made to have a convex curved plane 16. Then, the first and second opening portions 12 and 14 have been formed in the convex curved plane 16.

Figure 31:
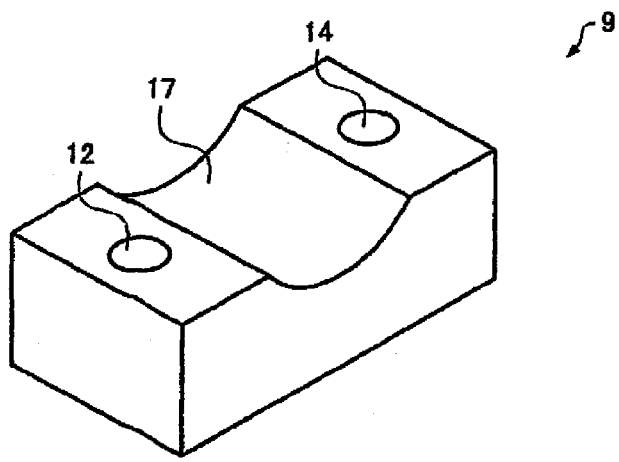
FIG. 31 is an explanatory diagram for explaining a microphone unit related to a seventh modification of the present invention.

FIG. 31 shows a microphone unit 9 according to a seventh modification of the embodiment mode to which the present invention has been applied.

As indicated in FIG. 31, in the microphone unit 9, a housing has been made of such a construction having a concave curved plane 17. Then, the first and second opening portions 12 and 14 may be alternatively arranged on the both sides of the concave curved plane 17. It should also be noted that the first and second opening portions 12 and 14 may be alternatively formed in the concave curved plane 17.

Figure 32:
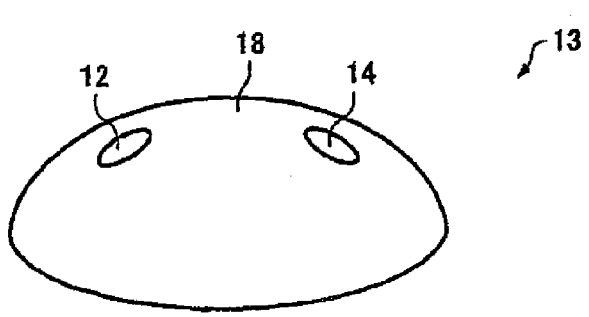
FIG. 32 is an explanatory diagram for explaining a microphone related to an eighth modification of the present invention.

FIG. 32 shows a microphone unit 13 according to an eighth modification of the embodiment mode to which the present invention has been applied.

As indicated in FIG. 32, in the microphone unit 13, a housing has been made of such a construction having a spherical plane 18. It should be understood that although a bottom plane of the spherical plane 18 may be made in a circular shape, the present invention is not limited thereto. For example, the bottom plane may be made in an elliptical shape. Then, the first and second opening portions 12 and 14 have been formed in the above-described spherical plane 18.

In accordance with these microphone units of the first to eighth modifications, similar effects to those of the above-described embodiment modes may be achieved. As a consequence, since electric signals are acquired based upon vibrations of vibration films, the electric signals indicative of only user voices may be acquired which do not contain noise components.

What is claimed is:

1. A microphone unit, comprising:
a housing, defining an inner space, and formed with a first opening and a second opening;
a partition member, partitioning the inner space into a first space communicated with the first opening and a second space communicated with the second opening, the partition member comprising a vibration film configured to be vibrated by sound to generate an electric signal; and
a shutter, configured to open or close one of the first opening and the second opening; and
an amplifier, configured to:
amplify the electric signal at a first gain when the shutter closes the one of the first opening and the second opening; and
amplify the electric signal at a second gain that is larger than the first gain when first opening and the second opening are opened.

2. The microphone unit according to claim 1, further comprising:
a detector, configured to detect whether or not the shutter closes the one of the first opening and the second opening, wherein
the amplifier is configured to control a switching between the first gain and the second gain based on a detection result of the detector.

3. The microphone unit according to claim 2, wherein
the detector includes a switch, arranged adjacent to either of the first opening or the second opening, the switch being configured to be activated when the shutter closes the one of the first opening and the second opening.

4. The microphone unit according to claim 1, wherein
the shutter includes a lid, configured to cover the one of the first opening and the second opening.

5. The microphone unit according to claim 1, further comprising:
a controller, configured to cause the shutter to open or close the one of the first opening and the second opening based on volume of the sound.

* * * * *